United States Patent
McDonnell

(10) Patent No.: US 7,097,137 B2
(45) Date of Patent: Aug. 29, 2006

(54) LAUNCH AND RECOVERY SYSTEM FOR UNMANNED AERIAL VEHICLES

(75) Inventor: William R. McDonnell, St. Louis, MO (US)

(73) Assignee: Advanced Aerospace Technologies, Inc., St. Louis, MO (US)

(*) Notice: Subject to any disclaimer, the term of this patent is extended or adjusted under 35 U.S.C. 154(b) by 0 days.

(21) Appl. No.: 10/754,251

(22) Filed: Jan. 9, 2004

(65) Prior Publication Data

US 2005/0017129 A1    Jan. 27, 2005

Related U.S. Application Data

(62) Division of application No. 10/031,925, filed as application No. PCT/US00/20099 on Jul. 24, 2000, now Pat. No. 6,874,729.

(60) Provisional application No. 60/145,286, filed on Jul. 23, 1999.

(51) Int. Cl.
*B64F 1/02* (2006.01)

(52) U.S. Cl. .................... 244/110 C; 244/110 F

(58) Field of Classification Search ........... 244/110 G, 244/110 R, 110 C, 110 F, 113, 114 R, 115
See application file for complete search history.

(56) References Cited

U.S. PATENT DOCUMENTS

| | | | | | |
|---|---|---|---|---|---|
| 965,881 | A | * | 8/1910 | Draper | 244/110 F |
| 968,339 | A | * | 8/1910 | Geraldson | 244/63 |
| 1,144,505 | A | * | 6/1915 | Steffan | 244/63 |
| 1,383,595 | A | * | 7/1921 | Black | 244/63 |
| 1,428,163 | A | * | 9/1922 | Harriss | 244/63 |
| 1,499,472 | A | * | 7/1924 | Pratt | 244/110 G |
| 1,556,348 | A | * | 10/1925 | Ray et al. | 244/110 G |
| 1,624,188 | A | * | 4/1927 | Simon | 244/110 F |
| 1,634,964 | A | * | 7/1927 | Steinmetz | 244/115 |
| 1,680,473 | A | * | 8/1928 | Parker | 244/110 F |
| 1,686,298 | A | * | 10/1928 | Uhl | 244/63 |
| 1,712,164 | A | * | 5/1929 | Peppin | 89/36.16 |
| 1,716,670 | A | | 6/1929 | Sperry | |
| 1,731,091 | A | * | 10/1929 | Belleville | 244/110 F |
| 1,737,483 | A | * | 11/1929 | Verret | 244/63 |
| 1,738,261 | A | * | 12/1929 | Perkins | 244/110 F |
| 1,748,663 | A | * | 2/1930 | Tucker | 244/63 |
| 1,756,747 | A | * | 4/1930 | Holland | 244/63 |
| 1,836,010 | A | * | 12/1931 | Audrain | 244/63 |

(Continued)

FOREIGN PATENT DOCUMENTS

DE    43 01 671 A1 *  7/1993

(Continued)

OTHER PUBLICATIONS

"Ames Builds Advanced Yawed-Wing RPV," Aviation Week & Space Technology, Jan. 22, 1973, p. 73.*

(Continued)

*Primary Examiner*—Teri Pham Luu
*Assistant Examiner*—S. A. Holzen
(74) *Attorney, Agent, or Firm*—Polster, Lieder, Woodruff & Lucchesi, L.C.

(57) ABSTRACT

A method of launching and retrieving a UAV (Unmanned Aerial Vehicle) (10). The preferred method of launch involves carrying the UAV (10) up to altitude using a parasail (8) similar to that used to carry tourists aloft. The UAV is dropped and picks up enough airspeed in the dive to perform a pull-up into level controlled flight. The preferred method of recovery is for the UAV to fly into and latch onto the parasail tow line (4) or cables hanging off the tow line and then be winched back down to the boat (2).

39 Claims, 20 Drawing Sheets

U.S. PATENT DOCUMENTS

| | | | | |
|---|---|---|---|---|
| 1,842,432 A * | 1/1932 | Stanton | ............... | 244/63 |
| 1,869,506 A * | 8/1932 | Richardson | ............... | 244/2 |
| 1,912,723 A * | 6/1933 | Perkins | ............... | 244/63 |
| 1,925,212 A * | 9/1933 | Steiber | ............... | 244/63 |
| 1,940,030 A * | 12/1933 | Steiber | ............... | 244/63 |
| 2,333,559 A * | 11/1943 | Grady et al. | ............... | 242/379.2 |
| 2,347,561 A * | 4/1944 | Howard et al. | ............... | 434/372 |
| 2,364,527 A * | 12/1944 | Haygood | ............... | 244/110 F |
| 2,365,778 A * | 12/1944 | Schwab | ............... | 89/1.11 |
| 2,365,827 A | 12/1944 | Liebert | | |
| 2,380,702 A * | 7/1945 | Persons | ............... | 244/110 G |
| 2,435,197 A * | 2/1948 | Brodie | ............... | 244/110 F |
| 2,448,209 A * | 8/1948 | Boyer et al. | ............... | 244/110 F |
| 2,465,936 A | 3/1949 | Schultz | | |
| 2,488,050 A * | 11/1949 | Brodie | ............... | 244/110 F |
| 2,526,348 A * | 10/1950 | Gouge | ............... | 114/230.3 |
| 2,669,403 A | 2/1954 | Milligan | | |
| 2,814,453 A * | 11/1957 | Trimble, Jr. et al. | ............... | 244/63 |
| 2,844,340 A * | 7/1958 | Daniels et al. | ............... | 244/110 C |
| 2,919,871 A * | 1/1960 | Sorensen | ............... | 244/110 C |
| 2,919,874 A * | 1/1960 | Strong | ............... | 248/103 |
| 3,069,118 A * | 12/1962 | Bernard | ............... | 244/110 R |
| RE25,406 E * | 6/1963 | Byrne | ............... | 244/110 R |
| 3,389,880 A * | 6/1968 | Ferguson | ............... | 244/137.1 |
| 3,454,244 A * | 7/1969 | Walander | ............... | 244/110 R |
| 3,484,061 A * | 12/1969 | Niemkiewicz | ............... | 244/110 R |
| 3,684,219 A | 8/1972 | King | | |
| 3,827,660 A * | 8/1974 | Doolittle | ............... | 244/110 C |
| 3,943,657 A * | 3/1976 | Leckie | ............... | 446/62 |
| 3,980,259 A | 9/1976 | Greenhalgh et al. | | |
| 4,039,219 A * | 8/1977 | Bugman | ............... | 294/82.19 |
| 4,067,139 A * | 1/1978 | Pinkerton et al. | ............... | 446/31 |
| 4,143,840 A * | 3/1979 | Bernard et al. | ............... | 244/110 C |
| 4,147,317 A * | 4/1979 | Mayhew et al. | ............... | 244/116 |
| D256,816 S * | 9/1980 | McMahon et al. | ............... | D21/449 |
| 4,311,290 A * | 1/1982 | Koper | ............... | 244/110 R |
| 4,408,737 A | 10/1983 | Schwaerzler | | |
| 4,523,729 A * | 6/1985 | Frick | ............... | 244/115 |
| 4,539,732 A * | 9/1985 | Wolner | ............... | 24/600.2 |
| 4,566,658 A * | 1/1986 | DiGiovanniantonio et al. | .. | 244/110 R |
| 4,753,400 A * | 6/1988 | Reuter et al. | ............... | 244/110 R |
| 4,790,497 A * | 12/1988 | Yoffe | ............... | 244/115 |
| 4,842,222 A | 6/1989 | Baird | | |
| 4,979,701 A * | 12/1990 | Colarik et al. | ............... | 244/110 C |
| 5,007,875 A * | 4/1991 | Dasa | ............... | 446/66 |
| 5,039,034 A * | 8/1991 | Burgess et al. | ............... | 244/110 F |
| 5,042,750 A | 8/1991 | Winter | | |
| 5,054,717 A * | 10/1991 | Taylor | ............... | 244/110 F |
| 5,509,624 A * | 4/1996 | Takahashi | ............... | 244/115 |
| 5,583,311 A * | 12/1996 | Rieger | ............... | 89/1.11 |
| 5,655,944 A * | 8/1997 | Fusselman | ............... | 446/67 |
| 5,687,930 A | 11/1997 | Wagner et al. | | |
| 5,906,336 A * | 5/1999 | Eckstein | ............... | 244/135 A |
| 6,264,140 B1 * | 7/2001 | McGeer et al. | ............... | 244/110 F |
| 6,478,650 B1 * | 11/2002 | Tsai | ............... | 446/102 |
| 6,874,729 B1 * | 4/2005 | McDonnell | ............... | 244/63 |
| 2002/0100838 A1 * | 8/2002 | McGeer et al. | ............... | 244/116 |
| 2003/0222173 A1 * | 12/2003 | McGeer et al. | ............... | 244/116 |
| 2005/0133665 A1 * | 6/2005 | Dennis et al. | ............... | 244/110 E |

FOREIGN PATENT DOCUMENTS

| | | | |
|---|---|---|---|
| DE | 4301671 | | 7/1993 |
| GB | 2080216 | | 2/1982 |
| GB | 2 080 216 A | * | 2/1988 |
| GB | 2 219 777 | * | 12/1989 |
| GB | 2219777 | | 12/1989 |
| WO | 0107318 | | 2/2001 |

OTHER PUBLICATIONS

Robinson, R., Thesis, "Dynamic Analysis of a Carousel Remotely Piloted Vehicle Recovery System", Dec. 1977.*

Dickard, H., Teledyn Ryan Aeronautcial, San Diego, California, "Mini-RPV Recovery System Conceptual Study", Contract DAAJ02-76-C-0048, Aug. 1977.*

Paul Proctor, "Runway in the Sky Evaluated for UAVs," Aviation Week & Space Technology, Jun. 5, 2000, p. 91.

* cited by examiner

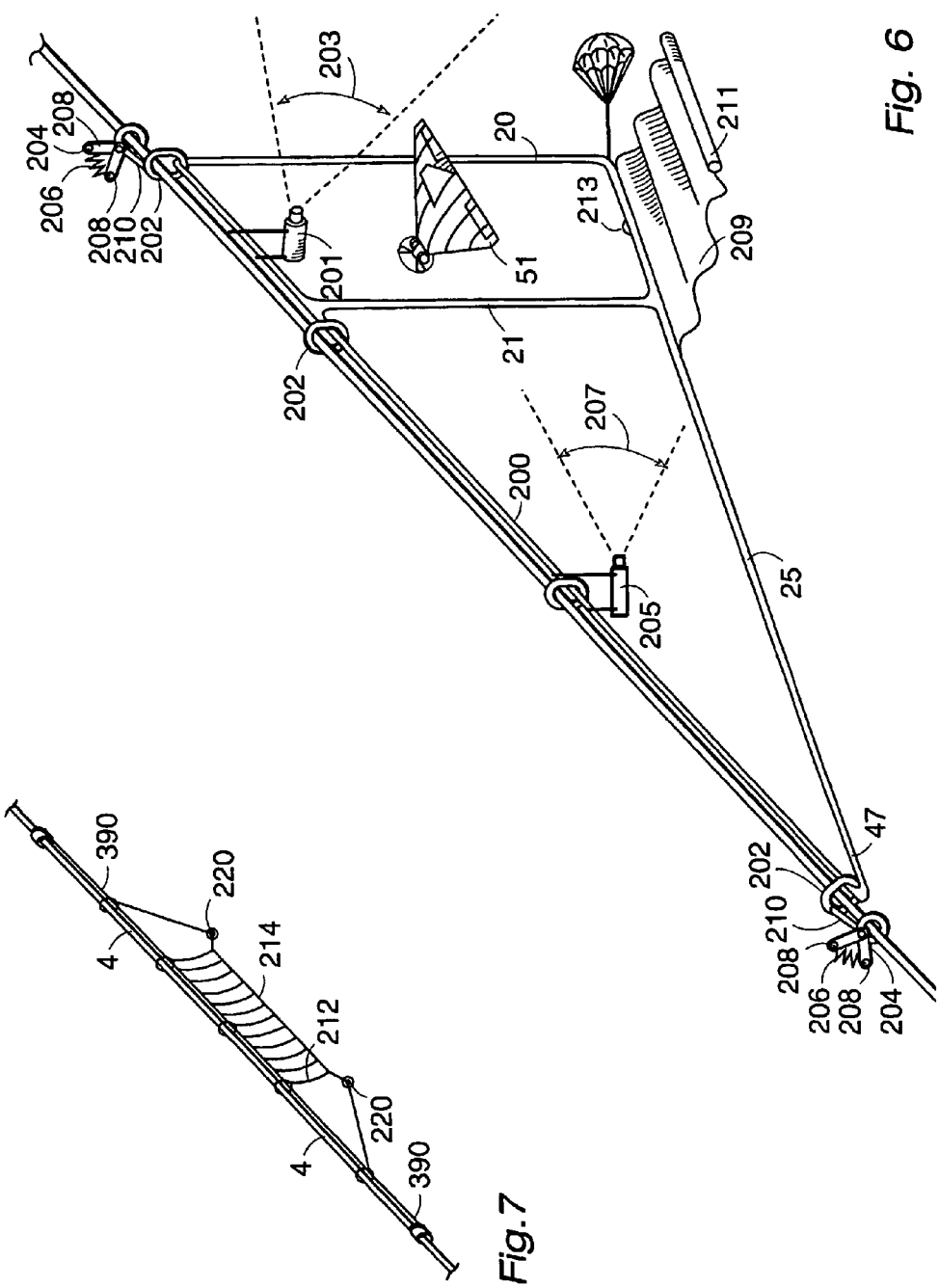

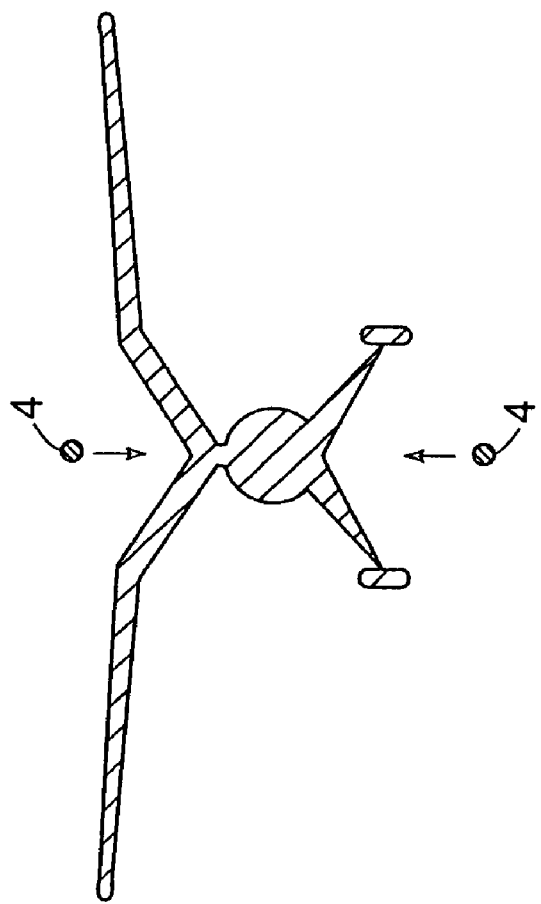
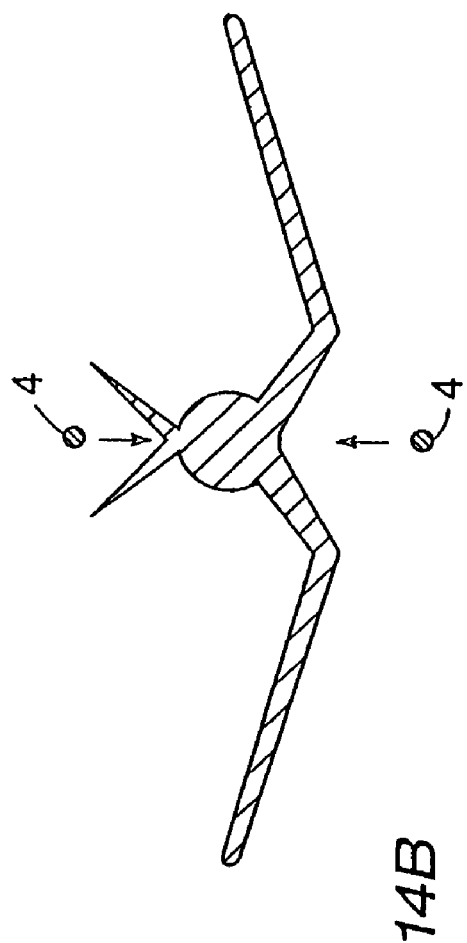

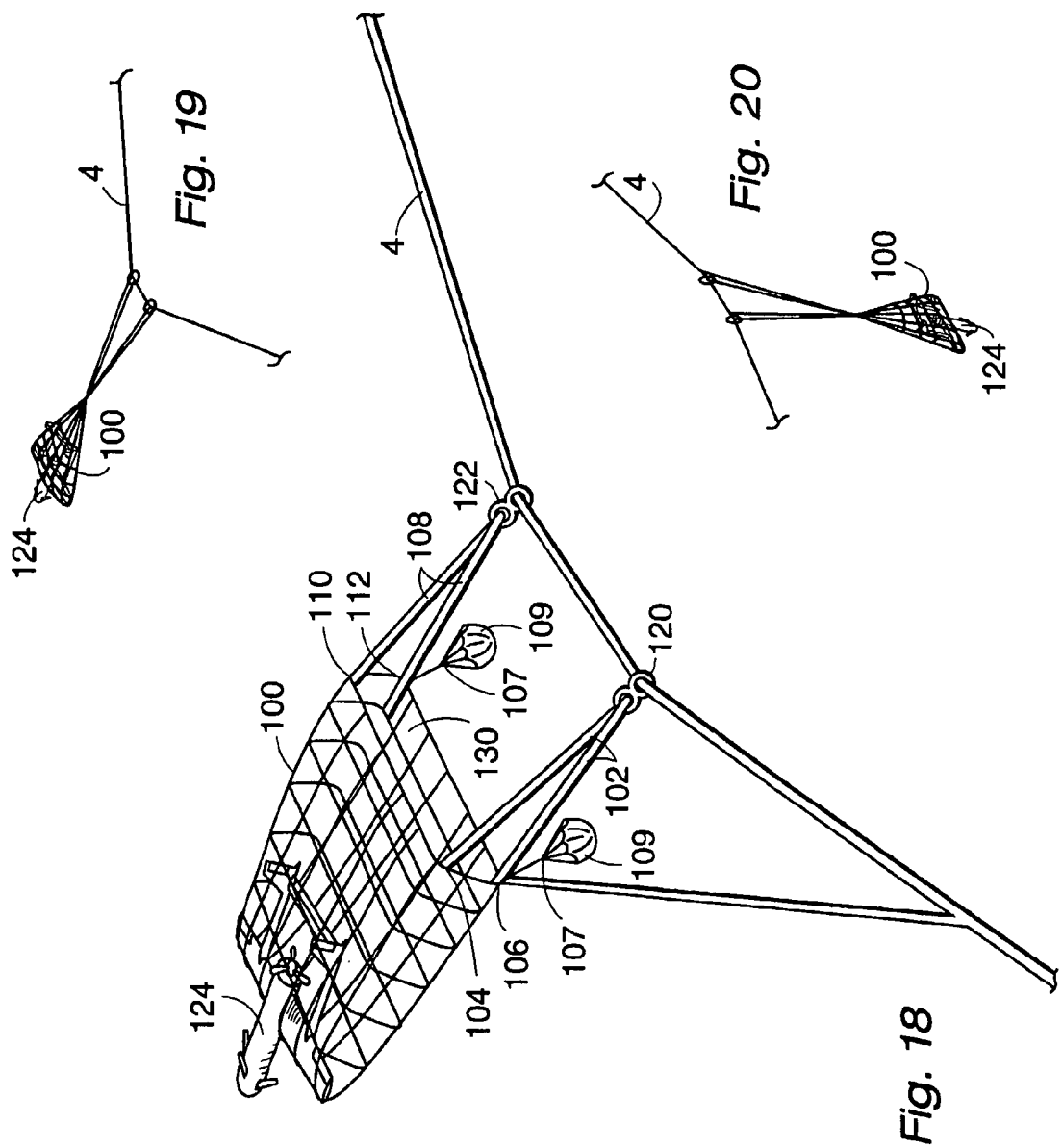

LAUNCH AND RECOVERY SYSTEM FOR UNMANNED AERIAL VEHICLES

CROSS-REFERENCE TO RELATED APPLICATIONS

This is a divisional application of now abandoned U.S. application Ser. No. 10/031,925, filed Jan. 23, 2002 now U.S. Pat. No. 6,874,729 (Section 371 date), which is a national phase application under 35 U.S.C. § 371 of PCT application US00/20099, filed Jul. 24, 2000, and claims priority of U.S. Provisional application No. 60/145,286, filed Jul. 23, 1999.

FIELD OF THE INVENTION

The present invention relates to the methods and mechanisms required to launch and retrieve aircraft from point locations without the use of runways.

BACKGROUND OF THE INVENTION

Previously glider aircraft have been towed aloft and then released to fly off on their own and catapults have been used to rapidly accelerate an aircraft up to flying speed in a short distance. Also aircraft have been fitted with tail hooks or other apparatus to try to engage arresting cables or have been flown into nets in order to arrest their forward movement in a short distance.

Prior art U.S. Pat. No. 4,753,400 (Reuter, et al.) comes closest to one of the preferred embodiments of the proposed invention. However this prior art discloses a very complicated system with a launching parachute and parachute retainer that gets jettisoned for each recovery cycle which in turn launches a ram-air parachute which holds up a ribbon parachute which acts to capture the UAV. A ship mounted stanchion, net and rotating cradle is then required to disentangle the UAV from the ribbon parachute. In this prior art the UAV engaged the ribbon parachute just below the supporting ram-air parachute with very little arrestment distance and thus very high loads. In this prior art the UAV approaches in the turbulent, blocked flow from the ribbon parachute and the ribbon parachute also causes a very large amount of unnecessary drag for the system.

There is also another problem with this prior art. Not only is there no apparent mechanism for retaining the UAV after it impacts the ribbon parachute but it would appear that the UAV would tend to bounce off and tend to drop from the ribbon parachute. Current state-of-the-art UAV launch and arrestment systems are bulky and difficult to integrate onto smaller ships and are time-consuming to operate, erect and tear down. In addition the recovery is very sensitive to sea states and ship motion and very often results in damage to the UAV and arrestment system. The recovery also requires significant piloting skills since the UAV must hit the center of the arrestment net in close proximity to the water, ship structure and personnel while traveling at relatively high speeds through the turbulent air wake from the ship.

SUMMARY OF THE INVENTION

The present invention provides improvements in the launch and recovery of aircraft from a point location without the need for runways. The preferred method of launch involves carrying the UAV up to altitude using a parasail similar to that used to carry tourists aloft. The UAV is dropped and picks up enough airspeed in the dive to perform a pull-up into level controlled flight.

The preferred method of recovery is for the UAV to fly into and latch onto the parasail tow line or secondary cables hanging from the parasail tow line and then be winched back down to the boat. Although not preferred, a net capturing device for use with a parasailing rig is disclosed. For land use a lighter than air suspended tethered parachute or a tethered tip drive rotor replaces the parasailing rig.

The proposed system is designed to avoid the previously described problems and also allow launch and recovery of UAVs from vessels down to as small as 25 feet long. The proposed system also offers the potential for other uses such as local area surveillance when no UAVs are operating near by, airborne decoys or antennas for intelligence or communications, and the like, by using the parasailing system by itself as an airborne platform.

This new launch and arrestment technique takes advantage of modern low cost commercial parasailing technology that is proven, safe, man-rated and can raise and lower passengers directly from the back of a small boat.

For launch the UAV is carried aloft in place of a passenger and released at altitude. The UAV picks up airspeed as it dives and the pilot pulls back on the control stick so the UAV will pull up into level flight. This technique has already been demonstrated. The release mechanism holds the UAV upright and facing forward into the relative wind.

For recovery the UAV engages the cable approximately half way between the ship and the parasail by deflecting the cable into a latching hook mechanism. The UAV is then reeled back in.

The resulting launch and recovery approach has the following characteristics;

A) Safer, less sensitive to sea states and requires less pilot training.
   Launch and recovery is performed at a safe altitude away from the water, ship and ship's personnel and if the UAV misses the cable it simply goes around for another attempt.
   The UAV's forward looking camera can be used for accurate guidance into the cable. The UAV avoids having to fly through the turbulent wake of the ship and is relatively unaffected by the pitching, rolling and heaving of the ship in higher sea states.

B) Less potential for damage.
   This system arrests the UAV over a greater distance than a conventional net system resulting in lower loads and the loads are applied at known UAV hardpoints. Arrestment loads are inversely proportional to the arrestment distance so that stopping a UAV in 100 feet takes only 10 percent of the loads of stopping it in 10 feet. The launch loads are, of course, dramatically reduced also. The potential of the UAV impacting the ship or water is greatly reduced.

C) More compact, easier to deploy, store and operate.
   The proposed system is compact enough to be used on 25 foot long parasailing boats. Deploying the system consists of running two of the parachute risers up a 10 foot flagpole or manually holding open the mouth of the parachute which causes the chute to fill with air and the parachute is reeled out. To store the system, the parachute is reeled back in and the two upper risers are pulled down to deflate the chute. The parachute need not be carefully folded and typically the risers are chain knotted and then the chute is stuffed in a bag.
   Unlike a net system the UAV after arrestment doesn't need to be disentangled from a net.

It is an object of the invention to provide a simple, compact, inexpensive, lightweight and safer method of launching and retrieving conventional fixed wing aircraft from a point location.

It is a further object of the invention to get the arrestment mechanism up above any objects the UAV might otherwise run into and above any turbulent air from objects near the water or ground such as the ship's superstructure, trees, etc.

It is an object of the invention to have an aircraft flight path that doesn't pass over the recovery ship to eliminate the potential that the aircraft might not firmly engage the recovery system yet be disturbed and crash land on the ship.

It is an additional objective of the invention to provide a launch and recovery system that exerts lower loads and inflicts less damage to the UAV and arrestment system.

It is an additional objective of the invention to provide an arrestment system that is less effected by heavy seas and the pitching, heaving and rolling of the recovery ship.

It is an object of the invention to have an arrestment system that uses a parasail.

It is a further object of the invention to provide improvements to parasails to improve their stability, reduce required ballast, and ease launch and recovery and deck handling.

It is an object of the invention to provide an arrestment system that achieves a firm latched engagement and is easier to disengage the UAV from the arrestment system after recovery.

It is an objective of the invention to provide a launch and arrestment system that can also provide other functions such as carrying sensors or antennas aloft for local area surveillance, communications, electronic intelligence or warfare or for getting steerable parachutes aloft that can be released for pilot parachute training or delivery missions.

It is a further object of the invention to utilize normal aircraft structure such as wings, fuselages and propeller guards or wires attached to these structures to guide the arrestment cable into engagement with a latching hook mechanism.

It is a further object of the invention to have a recovery system that can recover aircraft at a higher altitude to avoid ground fog or a lower altitude to be under the cloud cover.

It is another object of the invention to have a launch and recovery system that raises and lowers the aircraft in a level attitude for example for easy transfer on and off of its landing gear.

DESCRIPTION OF THE DRAWINGS

FIG. 6 is a view of an alternative way to attach recovery lines to the parasail tow line.

FIG. 7 is a view of an alternative way to attach recovery lines to the parasail tow line.

FIGS. 14A and 14B are frontal views of additional aircraft configurations for this invention.

FIGS. 18–20 show successive views of the net system in FIG. 17 just after capturing a UAV.

DESCRIPTION OF THE PREFERRED EMBODIMENTS

Launch-Preferred

Figure 1:
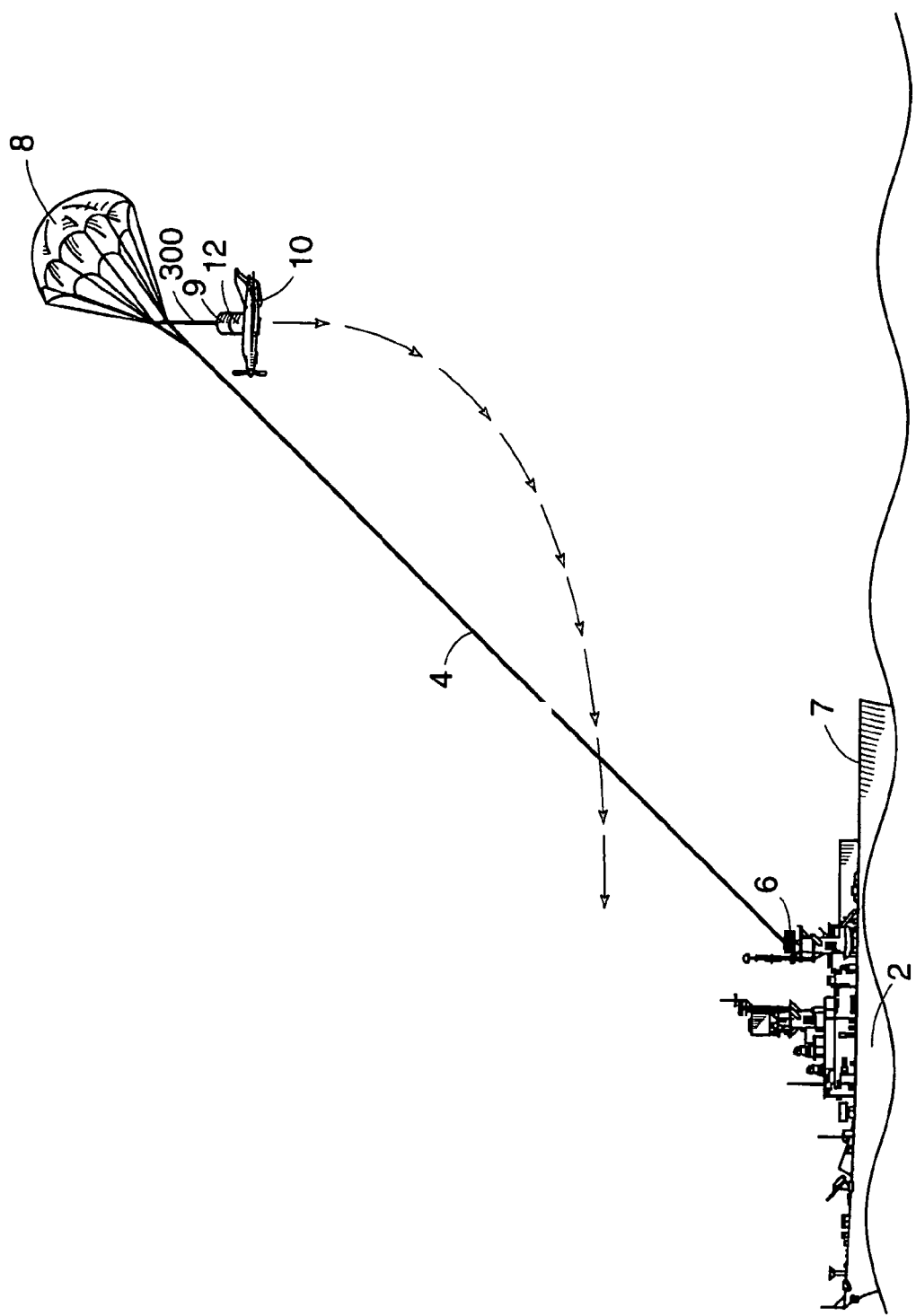
FIG. 1 is a side view of one embodiment of the invention showing the launch approach.

Referring now by reference numerals to the drawings and first to FIG. 1 one of the preferred embodiments comprises a boat 2, a tow line 4, winch 6, parachute 8, plastic barrel of water as a ballast weight 9, unmanned aerial vehicle (UAV) 10 and release mechanism 12. The launch procedure starts by inflating the parachute 8 which can be done by raising its risers with a pole designed for this purpose which is well known in the art or by having persons hold up the separated riser bundles until the chute inflates in the wind. Because conventional parasailing parachutes need a weight hanging under them to keep them oriented properly after the UAV has been released, a barrel of water 9 or other weight is attached where a tourist would normally be attached to go up parasailing. Use of such a water ballast is well known in the art as a method used for training people to operate parasailing equipment. The release mechanism and structure 12 can be integrated onto the bottom of the ballast 9 or can be detachable from it. It also can be made heavy enough so as not to require additional ballast for the parasail. The alternative is to have a steerable type parasail with a remote control unit pulling the control lines in place of a paratrooper to keep the parasail oriented upright so it is generating lift vertically.

Figure 2:
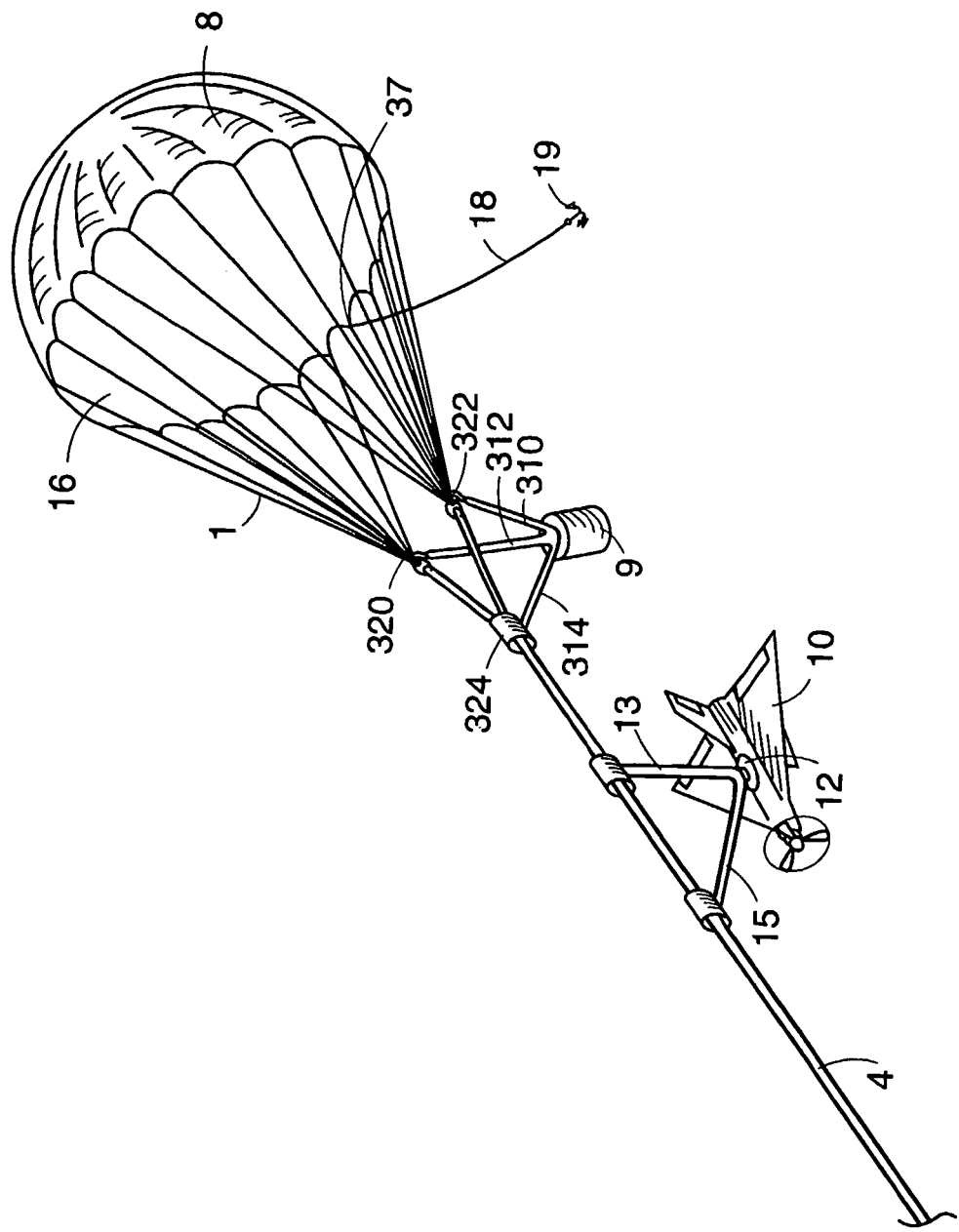
FIG. 2 is an isometric close up view of an alternative launch configuration.

For launch, the parasail is inflated first and then the ballast 9, release structure 12 and UAV 10 are combined and can either be raised so that straps 300 can be attached to the parasail harness in the conventional manner or the parasail harness can be pulled down to attach to the straps 300 as shown in FIG. 1. The straps 300 can also be attached when the parasail harness attach points on the left and right riser bundles are low enough to reach the straps 300 from the water barrel ballast 9 as is known in the art and then the system is raised into the air when the parasail is reeled out with the winch. With this later approach care may need to be taken to avoid excess swinging of the UAV and potential propeller contact with the deck. Engine run-ups can be performed on the deck before launch or after being attached to the line, but for the later approach it may be desirable to have a thrust link 15 such as shown in FIG. 2 if for example the aircraft has a tractor propeller without a propeller guard so that the propeller won't contact the tow line 4.

The winch 6 then reels the parachute out until the UAV has reached sufficient altitude for a launch. It should be understood that the release structure can hold the UAV in a somewhat nose up attitude so the UAV's wings are also generating lift to assist in raising the combined system and it should also be understood that the UAV's propulsive system could also assist for example if it's a vectored thrust vehicle like the Harrier or if the UAV is held in a nose up attitude by the release mechanism. As the UAV is approaching launch altitude the remote pilot can verify the proper operation of the flight controls by moving the UAV's control surfaces and watching the vehicle respond which is facilitated by the airflow and some flexibility in the mounting of the UAV.

Figure 3:
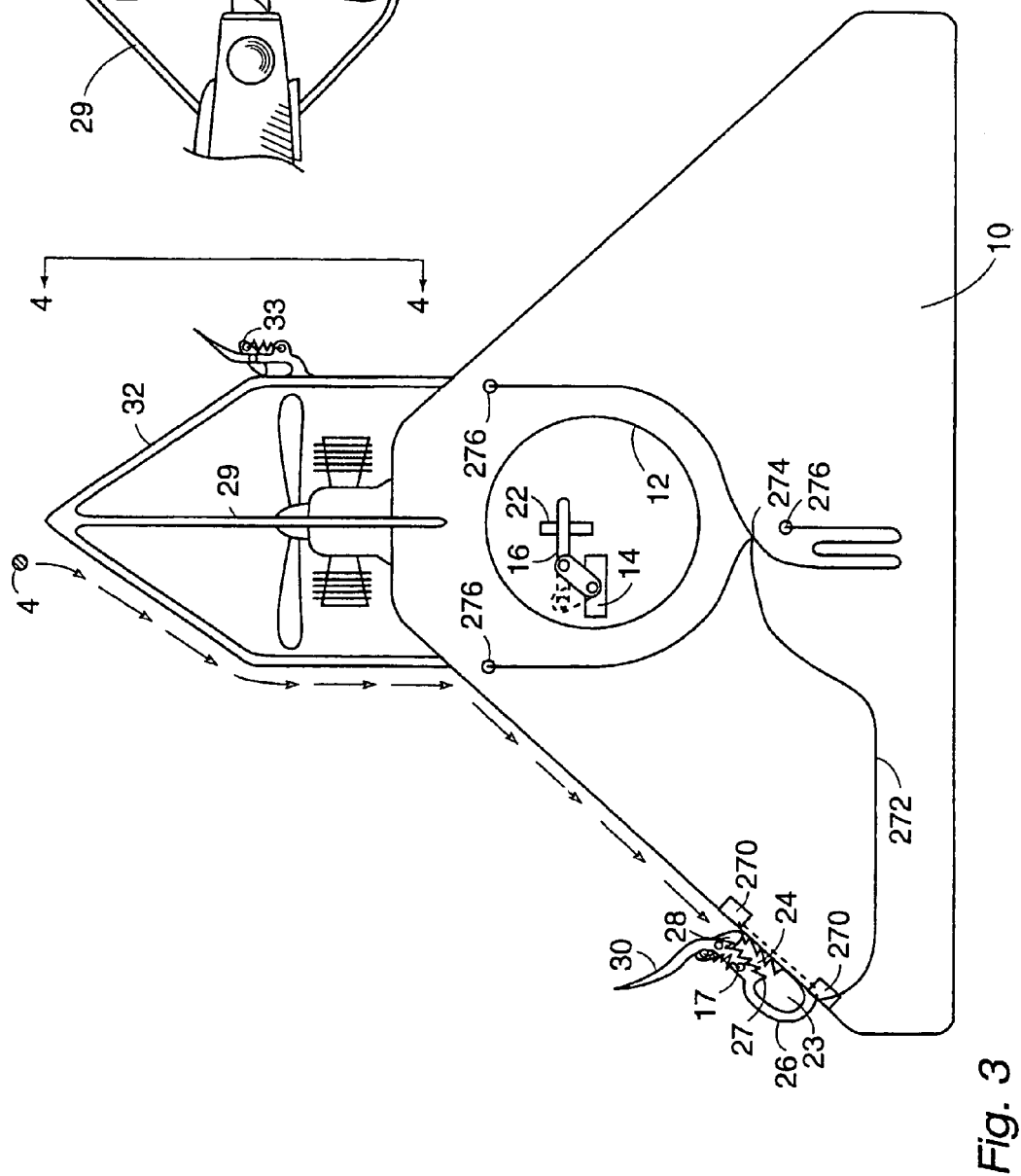
FIG. 3 is a plan view looking down on an unmanned aircraft designed to be launched and retrieved with this invention. A portion of the release mechanism used for launch is also shown.

The engine is placed at idle and a signal is then sent to the release mechanism 12 either through an electrical line carried by the tow line 4 or a radio signal. The mechanism that releases the UAV may consist of actuator 14 and pin 16 which engages UAV mounted bracket 22 as shown in FIG. 3. UAV 10 is held up only by pin 16 passing through a hole in bracket 22 which is part of the UAV but sticks up above the UAVs outer mold-line and into a slot provided in the bottom of the release mechanism structure. For clarity, only the outline of the release mechanism structure 12 where it bears against the upper surface of the UAV 10 with a circular rubber seal is shown in FIG. 3. The release structure 12 will help stabilize the UAV 10 from pitching, rolling and yawing since it bears down on the upper surface of the UAV all around the attach bracket 22 with the rubber seal. It will of course be understood that the release mechanism could also be part of the UAV 10 as opposed to being attached to the parasail system.

To release the UAV, actuator 14 pulls pin 16 out of UAV mounted structural bracket 22 allowing the UAV to fall. The UAV picks up speed in a dive, power is applied to the engine and once sufficient airspeed is achieved the pilot pulls back on the control stick so the UAV will do a pull-up into level controlled flight. During this process the pilot performs a mild turn so the UAV won't fly into the tow line 4.

Figure 8:
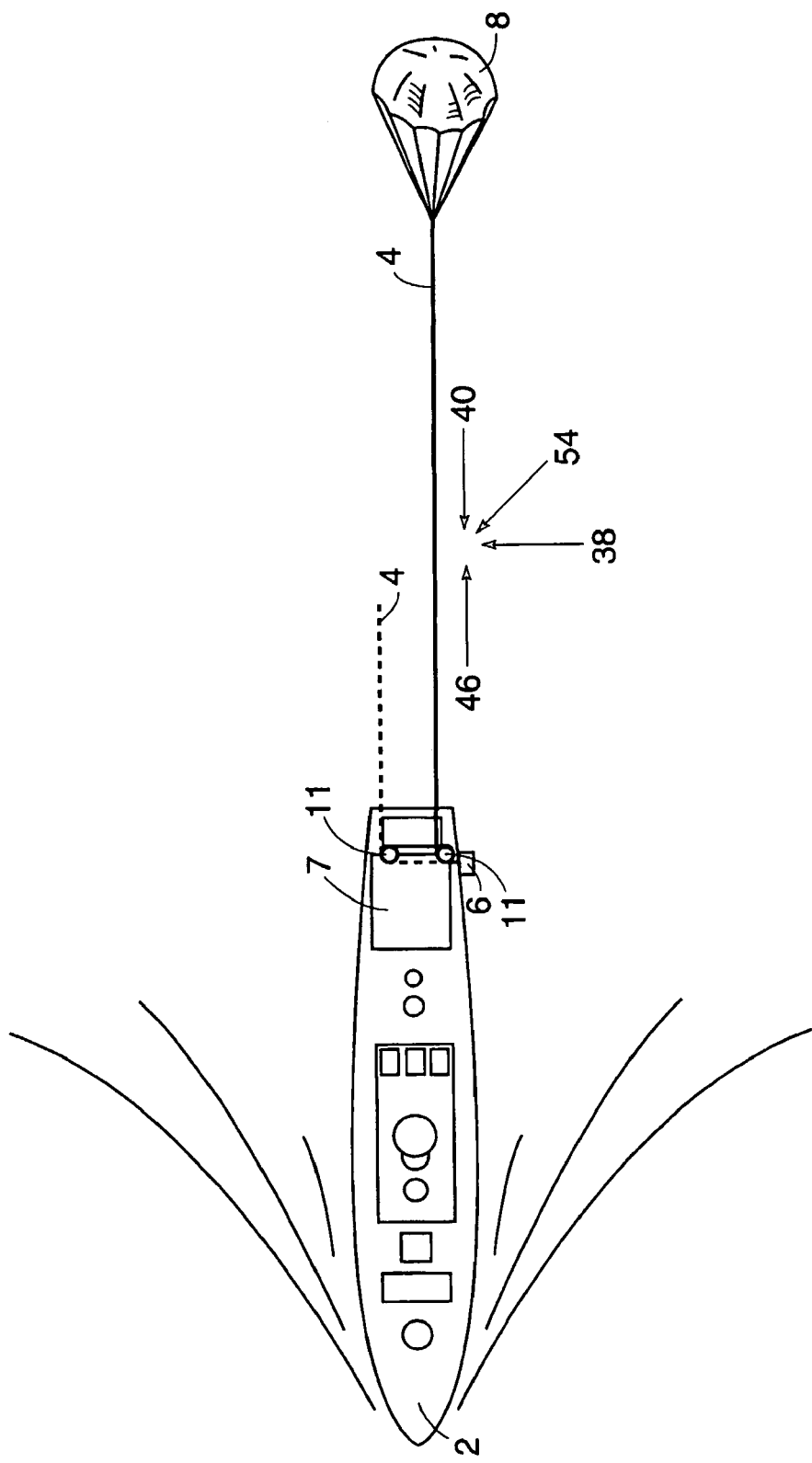
FIG. 8 is a top plan view of FIG. 5.

Although the winch 6 is shown on the highest deck of the ship in FIG. 1 it will very often be more advantageous to place the winch 6 on the ships flight deck 7. It can be advantageous to launch and retrieve the parachute on the upwind side of the flight deck 7 due to the air turbulence directly behind the ship's superstructure. FIG. 8 shows the preferred approach to do this where the winch 6 is mounted to the port side of the ship 2. The tow line 4 comes directly out of the winch 6 headed across the flight deck 7 toward the starboard side of the ship. The tow line 4 passes through a pulley assembly 11 which incorporates a hook that can be secured to an aircraft tie-down pad on the port side (as shown in solid lines) or the starboard side (as shown in dashed lines) so that it is easy to launch the parachute from the upwind side of the ship 2 without moving the winch 6 which might be connected to the ship's hydraulic system. The pulley assembly 11 preferably will never be located closer than 6 feet from the winch so as not to put too much side force on the level winder.

Launch Alternate

FIG. 2 shows an alternate launch arrangement where the release structure 12 connects not to the ballast 9 but to the tow line 4 through rods 13 and 15 which by attaching at two points on the tow line can help stabilize the UAV 10 in yaw and pitch. This arrangement might be better for some shipboard installations such as in the situation that it is difficult to get enough wind on the flight deck 7 to safely launch the UAV 12 due to the blockage of the ship's superstructure or the air turbulence causes the parasail to shake making it more difficult, for example, to start the aircraft's engine. Under these circumstances the parasail 8 and ballast 9 which weighs a lot less than the UAV 10 can be launched first and raised above the airflow blockage and turbulence from the superstructure in order to get the desired lift to launch the UAV 10.

Although the currently used approach to ballast a parasail is to use two flexible straps 300 to connect a water barrel ballast to the parasail risers as shown in FIG. 1, there is a better approach. FIG. 2 shows rigid roll stability rods 310, 312 and 314 that replace the currently used flexible straps 300 and also attaches the water ballast 9 to the point 324 where the parasail attaches to the tow line 4. Also the water barrel ballast 9 would be hung lower below the parasail risers than is presently the practice. These two changes allow a lighter ballast to be used and still achieve the same roll stability levels and also prevents a condition where the parasail can roll over too far and never recover.

Roll stability can best be described by stating that when the right parasail riser ring 320 gets higher than the left 322, more of the ballast weight is carried by ring 320 which causes the parasail to roll back level again. The farther the ballast is below these rings 320, 322 the faster the weight gets shifted to the uphill ring. Also there is a condition when a parasail is pulled too fast that it can oscillate side to side and roll 90 degrees or more so that all the weight is on one ring but that ring is on the centerline of the parasail so the weight isn't creating a restoring moment to roll the parasail back level. With the proposed configuration the rigid members 310, 312 and 314 would continue to hold the ballast weight out to the side and thus would continue to provide roll stability. Also rigid member 314 prevents ballast 9 from swinging back and forth excessively during a UAV arrestment.

Figure 5:
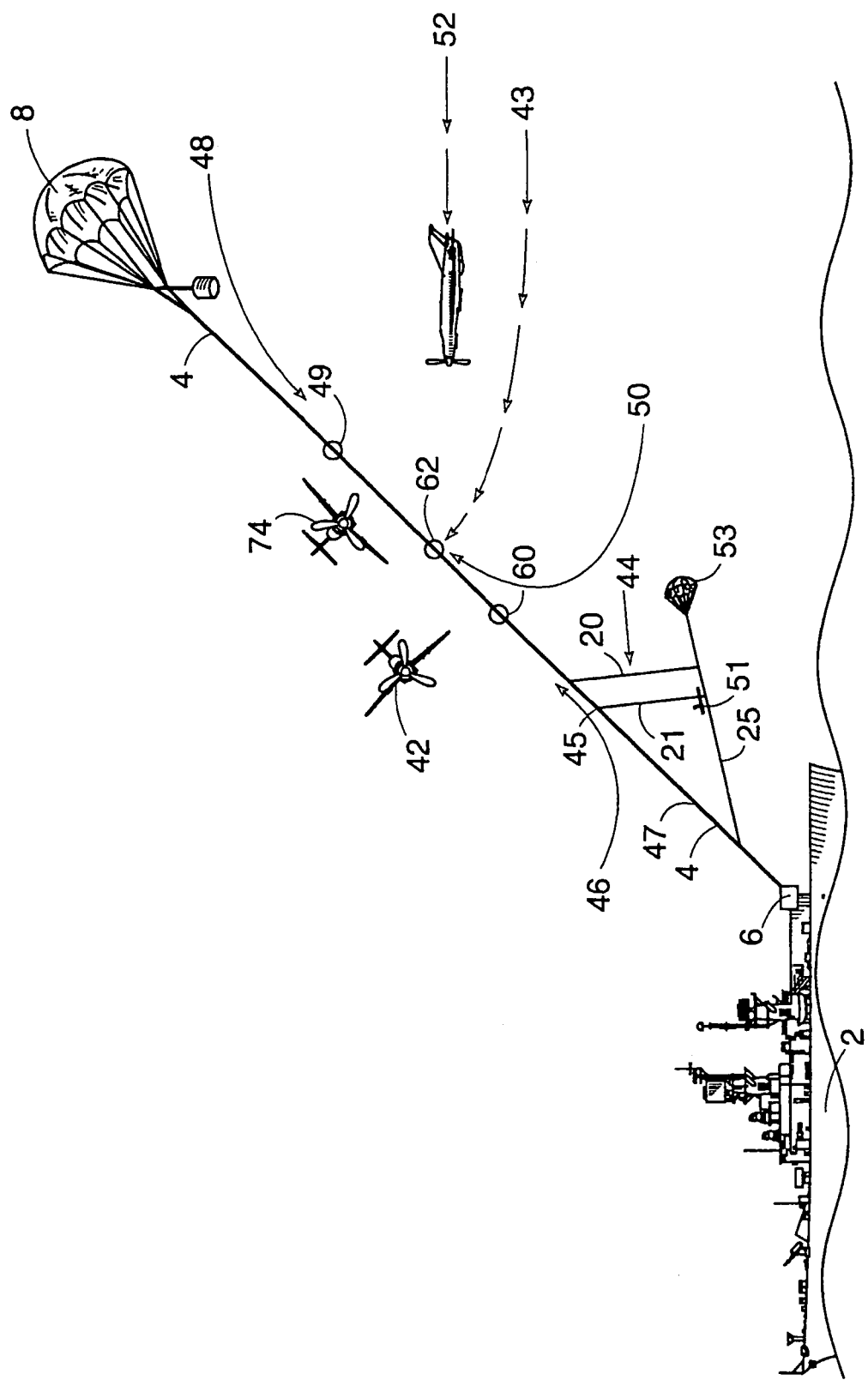
FIG. 5 is a side view of one embodiment of the invention showing different arrestment approaches.

For the arrestment and recovery, the UAV 10 flies into and latches onto cables suspended below the parasail 8 as shown in FIG. 5. There are many different preferred configurations because the current invention is intended to be useable with all different sizes, configurations and structural designs of existing aircraft. For example with a small UAV the wingtip ends up being a good place to put a latching hook to engage one of the cables but larger aircraft do not naturally have enough structure at the wingtip to handle the arrestment loads. Putting a latching mechanism on the nose of the aircraft is desirable until the aircraft gets too heavy to manhandle by sailors on the deck and then it is desirable to have the latching mechanism near and preferably above the vehicles center of gravity so that it hangs level or can be leveled by hand and lowered onto its landing gear or a ground trolley. The alternative more man-power intensive approaches are to have a crane that can be manually attached to the UAV's release point so as to support and level the UAV as it is lowered by the parasail. Alternatively a line or structural member that is always carried by the UAV 10 can connect a detachable latching hook used in the engagement with a typical parachute harness or other hardpoint over the vehicles center of gravity for holding the UAV level.

Arrestment-Preferred Approach

For the arrestment, the preferred approach is for the vehicle to fly into and latch onto a net or multiple lines hanging down from the tow line 4 approximately half way between the parasail and the ship and with the UAV flying at right angles to the direction of travel of the ship as shown by flight path 38 in FIG. 8. The multiple lines make a larger, easier target for the pilot. In order to make sure that the lines do not blow open wide enough to miss the UAV's latching mechanisms the vertical lines can be connected with horizontal lines to effectively form a net and/or tension can be created on the lines such as shown with lines 20, 21 in FIG. 5 where rope 25 connecting the bottoms of lines 20, 21 can be of relatively large diameter to add some weight and stiffness and/or a small parachute 53 can provide tension in line 25 and in turn a download on lines 20, 21. It is of course understood that the UAV can directly latch onto the tow line 4. Although not preferred it is of course understood that lines could also hang down directly from the parasail 8. In this latter case the preferred approach would be to have a relatively long line and the energy would be absorbed by gravity and aerodynamic drag as the UAV contacts and then swings the line up and then continues to swing back and forth.

Preferred Flight Path

The preferred flight path of the UAV for engagement is at right angles to the direction of travel of the ship as shown by arrow 38 in FIG. 8. In this manner a level approach can be used and the arrestment energy is absorbed primarily by deflecting the tow line to the side. It also makes it the easiest to hang a net or series of vertically hanging lines on the tow line 4 at right angles to the direction of flight of the UAV 10. It also makes it easier for the UAV pilot to find the arrestment point if a banner or flag is used since the wind will blow it out at right angles to his line of sight. Also if the UAV was not properly captured but falling out of control it wouldn't land on the ship. The UAV pilot will generally fly the aircraft into engagement using a forward looking camera onboard the aircraft. However if the onboard camera fails, gets fowled by oil or water or whatever a camera 201 and/or 205 can be placed on the tow line or recovery lines above and to the side of the intended arrestment point as shown in FIG. 6 and looking in the direction of the oncoming aircraft with field of views 203 and 207 to help the pilot steer the aircraft in. Also the image from these cameras 201 and 205 can be flipped electronically left to right and right to left before being displayed to the remote pilot so that the pilot can fly the aircraft as if it is flying away from him instead of flying towards him which is much more natural. In the configuration shown in FIG. 6 the remote pilot would fly the aircraft so that it flies directly below camera 201. It will be noted that at some point the aircraft passes out of camera 201's field of view. Camera 205 can be helpful in better gauging the proper height than using camera 201 by itself and in fact one pilot watching the image from camera 205 could concentrate on keeping the aircraft at the correct altitude while the other pilot looking through camera 201 concentrates on keeping it centered left to right. If only camera 201 is utilized then it is advisable, in order to help the pilot best gauge the proper aircraft height and hit the center of the arrestment lines, to paint straight vanishing lines on the pilot's display that trace the ideal location of the aircraft's wingtips during the approach as the wingtips get farther and farther apart and lower on the display screen. Cameras to the left and right of the ideal arrestment point and at the correct height can also be very effective.

Delta Wing Configuration

In the configuration shown in FIG. 3, the tow line 4 or secondary lines such as 20, 21 contact the leading edge of the UAV 10 and are deflected out to the wingtip where they engage a hook 26. A spring loaded latch 28 may be positioned at the entry point of hook 26 which deflects out of the way and then snaps closed to trap tow line 4 inside hook 26. The hook 26 may have a forward swept extension 30 on the outboard side that could first deflect the cable inboard before engaging the hook 26. For a straight winged aircraft a wire can be strung from the nose of the aircraft, or along the fuselage, to the wingtip to drive the cable out to the hook to simulate the leading edge of a delta wing. Hook 26 may be permanently attached at the wingtip or may be retained with tape 270 that is designed to tear under the load of an engagement. In this later case, as shown in FIG. 3, the hook 26 would be attached to cable 272 which in turn is attached to a three cable harness 274 which attaches to three or more hard points 276 on the top surface of the aircraft and is also taped in place until the arrestment loads pull it free. With this approach, after the arrestment, the aircraft 10 ends up being suspended in a level attitude below the harness in the same manner used for parasail deployments.

Hook Retaining

Although it is very desirable to have a latching mechanism which allows a simple hook design, it is not absolutely mandatory because of the location and design of this hook. The center of gravity of the UAV is approximately at bracket 22 so the arrestment loads and loads to support the UAV after arrestment will in general both be continuing to try to force the tow line 4 into the hook 26 and not trying to pull it out. In addition, for example, the force of the arrestment might drive the tow line 4 through the throat 24 of the hook even though the line 4 is larger in diameter than the throat 24. This can be done by either compressing the line 4 or the temporary enlargement of the throat 24 due to the arrestment loads causing the hook 26 to flex open. As a result the line 4 will not pass back out through the throat 24 without a significant load being applied. With enough flexibility in hook 26, throat 24 might be totally closed except when the line 4 forces it open in order to pass through. Inner throat 23 might be larger, the same size or smaller than outer throat 24 and might essentially have an inner hook 27 so it is difficult for the line 4 to find its way out of the hook 26. Also barbs 17 on hook 26 might further restrain the line 4 from exiting the hook 26. For extremely light micro-UAVs, even Velcro or magnets might be strong enough to provide the engaging mechanism in place of hook 26.

Figure 4:
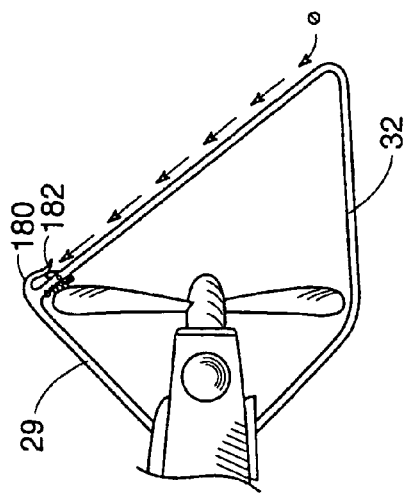
FIG. 4 is a view in side elevation taken along lines 4-4 in FIG. 3.

For tractor propeller UAV configurations such as shown in FIGS. 3 and 4, a propeller guard 32 may be used to deflect the line 4 around the propeller. As an alternative to placing the latching mechanism 26 on the wingtips it can also be placed on the propeller guard as illustrated by hook and latching mechanism 33 in FIG. 3. This adds some weight up forward which helps if the aircraft has an aft center of gravity problem and reduces the need for substantial structure out at the wingtips but the narrower spacing between the left and right ends of the propeller guard means that the arresting system needs more vertically suspended lines spaced closer to each other to make sure that at least one line will be deflected by the propeller guard into engagement with a latching hook 33. Latching hooks could also be placed on the propeller guard rods 29 above or below the propeller to deflect and capture horizontal lines in the net. It is best to deflect lines in the direction of the least resistance to assure a successful engagement. If a net is hanging from the tow line 4 without any devices such as small parachutes or weights at the bottom of the net to provide tension or a restraint to the bottom of the net then the least direction of resistance is toward the tow line 4. If the UAV is using flight path 38 then up and/or to the left toward the tow line 4 is the preferred direction to deflect the cable. FIG. 4 shows a side view of the nose of the aircraft in FIG. 3 and shows how propeller guard 29 is designed to push a line of the net up and into engagement with hook 180. After engagement the net will want to pull up and aft relative to the aircraft so hook 180 has a top spike 182 that prevents the line from going up and forces it to go aft into the mouth of the hook 180.

Figure 9:
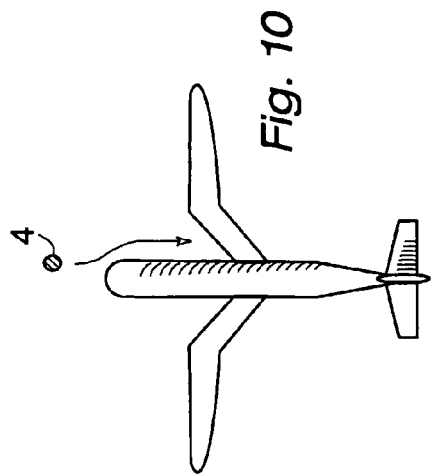
FIGS. 9–12 are plan views of some other aircraft configurations for this invention.
Figure 10:
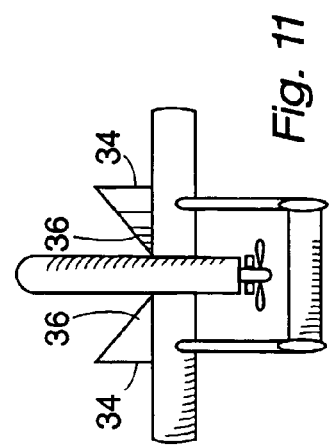
Figure 12:
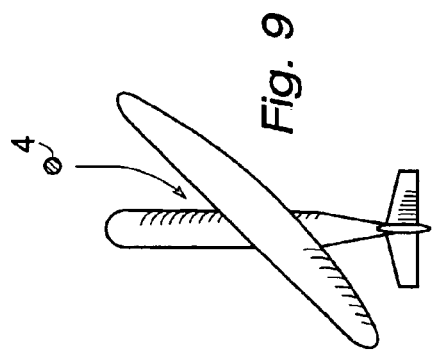
Figure 11:
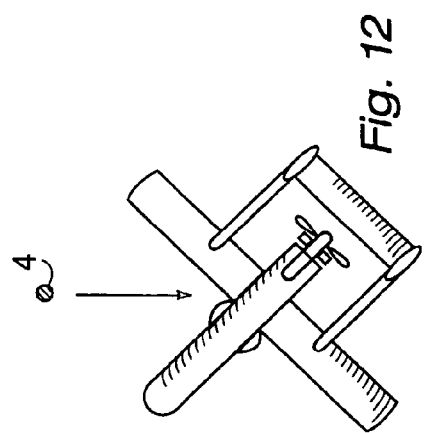
Figure 13:
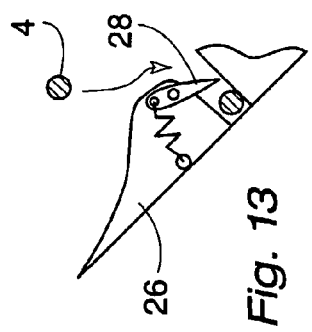
FIG. 13 is an enlarged view of the hook mechanism on the aircraft in FIG. 12.

FIGS. 9-11 show a number of UAV configurations designed to deflect the cable in to the wing root which is very close to the center of gravity and where the structure is naturally very strong. For example, a forward swept wing will naturally tend to deflect the tow line 4 in toward the wing root area. The UAV configuration in FIG. 10 has a forward swept wing out to about half span and the configuration in FIG. 11 achieves the same effect by adding forward pointing rods 34 and wires 36 to deflect the cable into the latching hook at the wing root. Alternatively, a wire from the aircraft's nose to a wingtip could drive the cable out to a latching mechanism at the tip similar to that described for delta wing aircraft. For stowage onboard ship it can be desirable to have a UAV where the wing can be rotated 90 degrees to lay flush over the fuselage. For this kind of configuration prior to arrestment, the wing could be rotated up to 45 degrees such as shown in FIG. 9 in order to direct the tow line 4 into a latched engagement by the wing root. An equivalent forward swept snare arrangement using the side of the fuselage and one of the wings can also be achieved with a straight winged aircraft as shown in FIG. 12. This can be achieved by yawing or side-slipping the vehicle with the rudder prior to engagement and/or by intersecting the tow line 4 by flying perpendicular to the direction of travel of the parachute and tow line 4 as shown by flight path arrow 38 in FIG. 8. In the latter approach the movement of the tow line 4 in the direction indicated by flight path arrow 40 in FIG. 8 provides the same effect as some yawing of the aircraft to help drive the cable in to the aircraft's wing root area. A front view of a UAV 42 in FIG. 5 is shown in a side-slip while on a perpendicular flight path prior to engagement with tow line 4 at point 60. It can be seen that the rolled attitude to achieve the side-slip also places the wings at a favorable more perpendicular angle to the tow line 4 for the largest capture envelope. The arrestment line configuration that is shown in FIG. 6 also can help drive the arrestment lines 20, 21 into the vehicles wing root area since line 25 will go tight after an engagement and start pulling the bottoms of line 20, 21 to the left toward the aircraft's wing root area. The straight winged aircraft configuration in FIG. 12 can also engage a net since the forward fuselage will penetrate through a hole in a net with wide spacings between lines until the net hits the wing and then the load from the engagement will pull the net back against the wing and inboard to wrap around and under the fuselage which will drive the cables of the net into the left and right wing root latching mechanisms shown in FIG. 13.

For many of the configurations such as those described in FIGS. 3, 9, 10 and 11, it is desirable to have at least a 15 degree swept back or 20 degree swept forward angle on the leading edge of the aircraft's wing or other lateral deflecting structure in order to more reliably deflect the arresting cable to the hook independent of normal aircraft yaw angles. In most of the configurations described so far the UAV is designed to deflect a cable laterally inboard or outboard relative to the UAV and into engagement with a latching hook. It is also understood that it is possible to design a UAV to deflect a horizontally strung cable vertically relative to the UAV into a latching hook using, for example, an upper surface hook, a nose 71 or tail hook 70, grappling hook 75 or vertical tail surface latching hook 72 of a UAV 74 as shown in FIG. 15.

Figure 17:
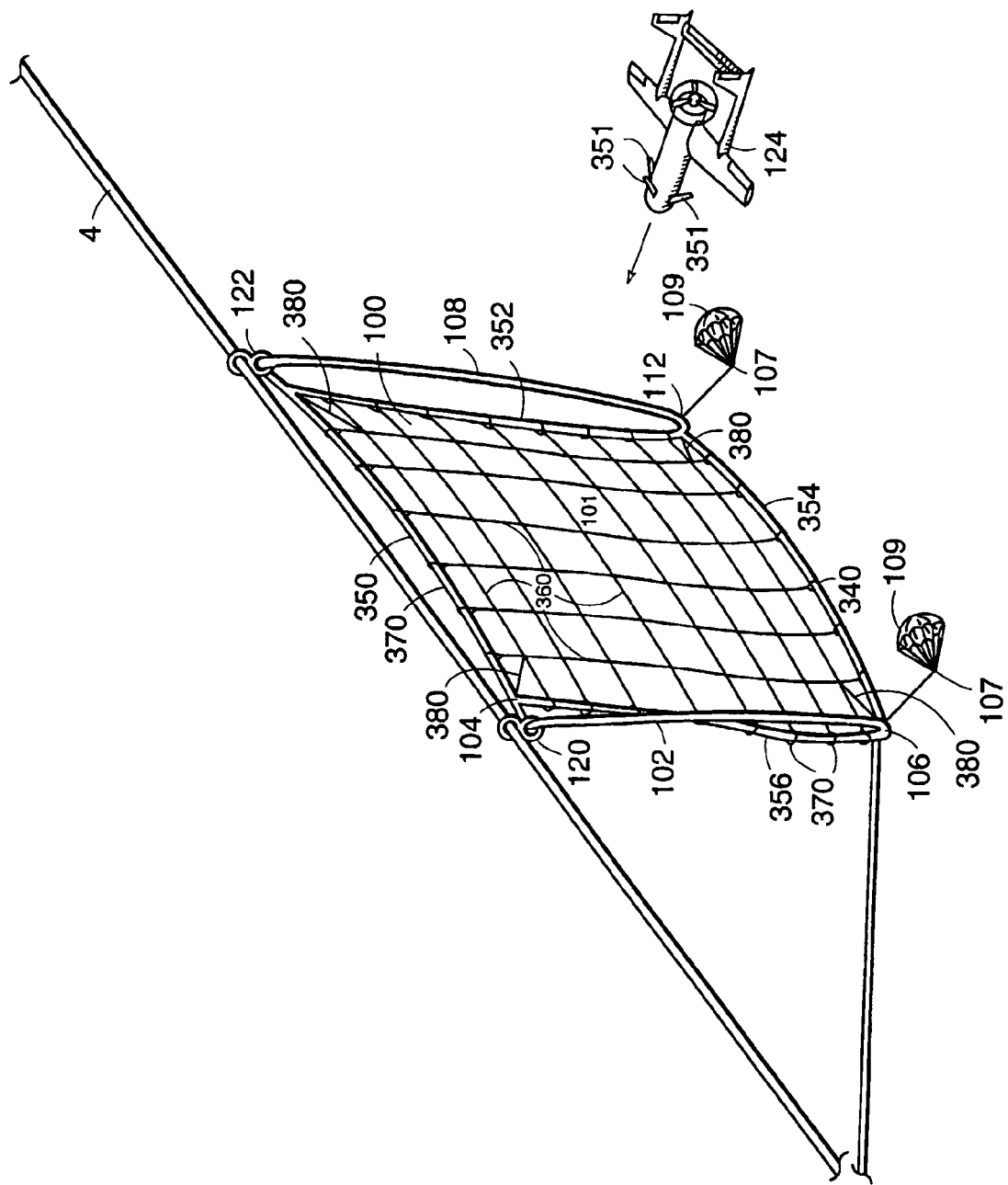
FIG. 17 is an isometric view of a net system attached to the parasail tow line designed to capture an aircraft.

Ever since aircraft first tried to snag a horizontal wire strung across a flight deck with a tail hook people have tried to use this basic approach. This approach works well on a flight deck because the deck guides the aircraft and tail hook into engagement with the horizontal cable. However, it is more difficult when a large flight deck is not available and the pilot must control the height more precisely and/or a large vertical deflector must be added to the aircraft which adds weight and drag. One preferred approach to handle this problem is to have a small nose deflector 71 and latching mechanism designed to engage a net with multiple horizontally strung lines as part of a net such as shown in FIG. 17.

Figure 15:
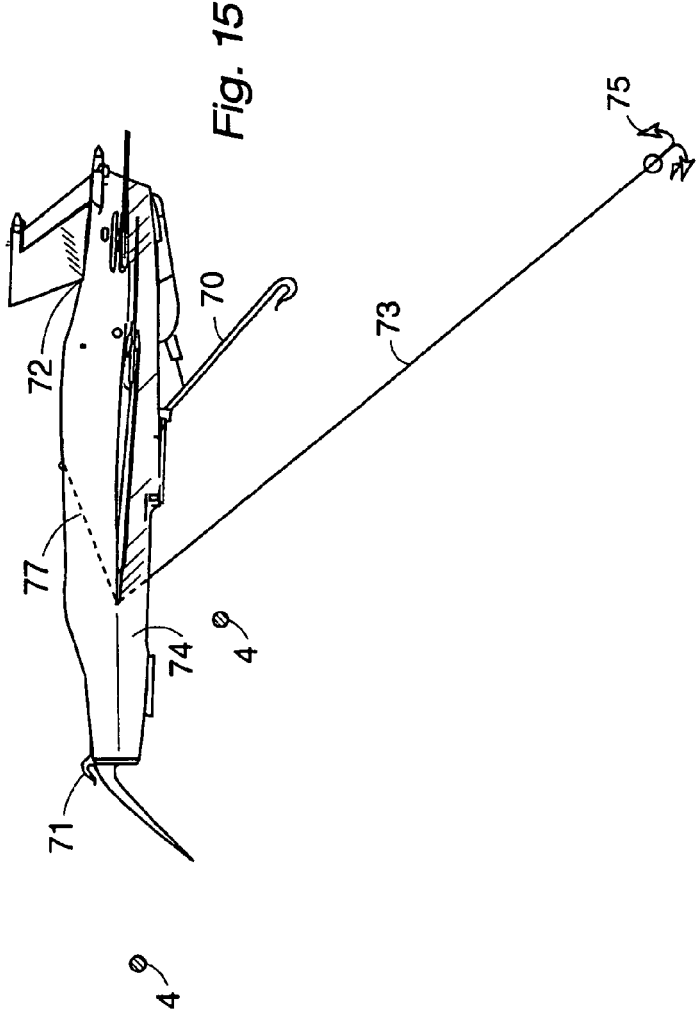
FIG. 15 is a side view of the aircraft equipped with a grappling hook for the parasail tow line.
Figure 16:
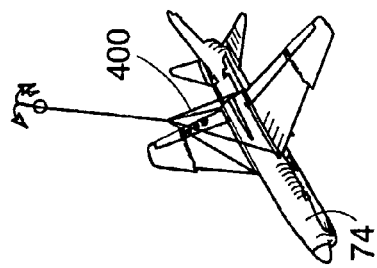
FIG. 16 is a view of the aircraft equipped with a grappling hook and suspension harness.

Another approach is to use a grappling hook 75 on a line 73 attached to the UAV 74 near its center of gravity as shown in FIG. 15. The UAV 74 would preferably fly upside down for the engagement or a portion 77 (shown in dashed lines) of the line 73 would be strung around the side of the fuselage and attached to the top of the UAV 74 over the center of gravity with or without a typical UAV parachute harness attachment 400, as shown in FIG. 16, so the UAV 74 would hang right side up and level when it is lowered onto the flight deck 7. A release mechanism (not shown) of course could be used so that the grappling hook 75 could be held in a retracted position for most of the flight and released to hang down on its cable just prior to an arrestment. An aft view of UAV 74 in FIG. 5 shows how it could engage the tow line 4 with its wings banked at the same angle as the slope of the tow line 4 and with the UAV 74 in a sideslip and approaching the tow line 4 from the side such as flight path 38 as shown in FIG. 8.

Figure 26:
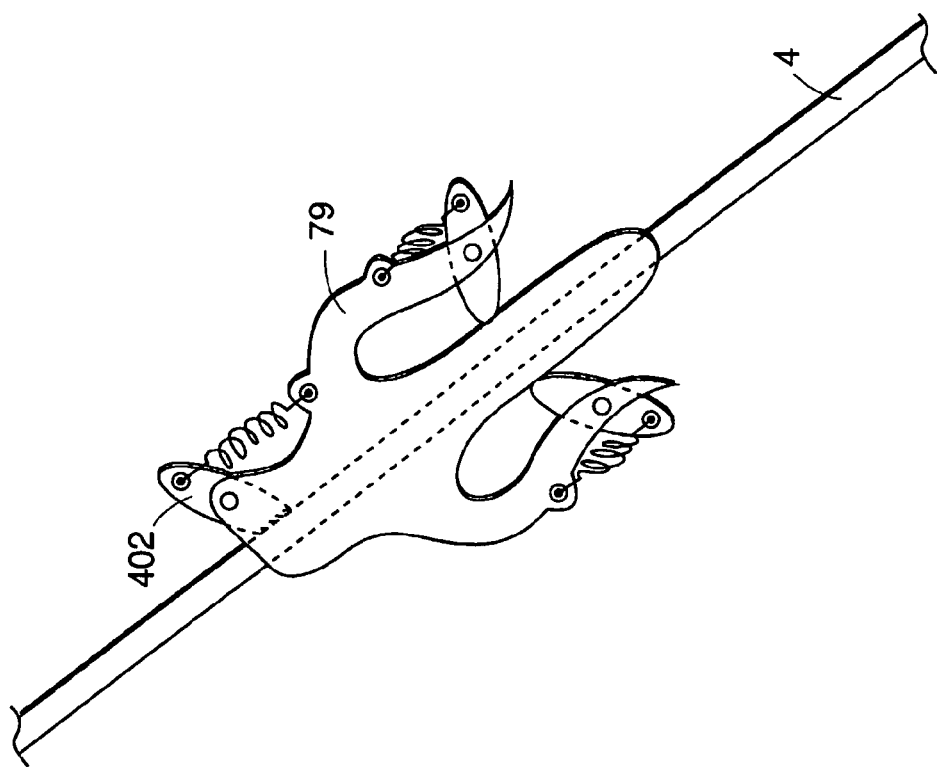
FIG. 26 shows a tow line hook mechanism.

It should be understood that a traveler mechanism consisting of one or more grappling hooks 79 with latches could also be placed on the tow line 4 with the tow line 4 passing up through the centerline of the grappling hook 79 as shown in FIG. 26. The UAV could be arrested by flying flight path 46 as shown in FIGS. 5 and 8 with aircraft drag line 73 sliding up along the side of tow line 4 and into engagement with four sided grappling hook 79. Hook 79 would incorporate an ascender mechanism 402 in it which is well known in the art of mountain climbing equipment that allows the grappling hook 79 to easily slide up the tow line 4 but not down. With this system grappling hook 75 could be replaced by just a fixed stop.

It is also understood that for example a fixed grappling hook could be placed on a line hanging below the tow line such as line 25 in FIG. 5 but without use of a parachute 53 so that the line 25 is more highly restrained at the left point 47 than at the right. The aircraft could fly a flight path 38 and aircraft drag line 73 could then deflect and slide along line 25 until it engages the grappling hook.

For nose-mounted latching hooks such as 33 and 71 the preferred approach is to use flight path 38 and fly into and engage the ropes of a net similar to that shown in FIG. 17. The ropes of the net would be close enough together that the latching hooks would be assured of engaging one of the lines. Another approach utilizing a retaining trap is shown by rods 351 on aircraft 124 in FIG. 17 which are spring loaded out but are hinged about their forward end so that they can lay back flat against the fuselage. As the nose of the aircraft pushes through a hole in the net the rods 351 are forced back into their retracted position against the fuselage and then pop back up where they prevent the aircraft from sliding back out of the net. Other approaches are of course possible such as a claw that closes and grabs a line in the net in the same manner as a train coupling.

It is understood that the UAV can engage the tow line 4 directly or can engage one or more other arrestment lines such as 20 and 21 as shown in FIG. 5 and in more detail in FIG. 6 hanging down from the tow line 4 directly or hanging down from a beam mounted on the tow line 4.

The kinetic energy of the UAV during an arrestment is dissipated primarily through aerodynamic drag of the parachute 8 and tow line 4, mechanical friction on the tow line 4, drag from the winch as it reels out the tow line and gravity with the amounts varying based on which arrestment approach is used. Arrestments can be made with the vehicle intersecting the tow line 4 or secondary arrestment lines 20, 21 approximately perpendicular (which is the preferred approach) or approximately parallel or somewhere in between.

Flight paths 52 in FIGS. 5 and 54 in FIG. 8 are examples of intersecting the arresting cables at an intermediate angle. An engagement using flight path 52 as shown from the side in FIG. 5 and flight path 40 as seen from above in FIG. 8 represents what will be called a co-incident engagement where the aircraft is flying level and in the same direction of travel as the parasail 8 and overtaking the parasail 8 and tow line 4 from the rear.

Referring to FIG. 5, flight path 43 achieves a perpendicular engagement by doing a pull up or sustained climb prior to engagement. If a pull-up is used, the pilot might time the maneuver for example by using the forward looking camera to fly at a point 60 marked on the tow line 4 such as with a strobe or flag until another point 62 is at the top of his video screen at which point he would do a pull-up to intersect the tow line 4 just below point 62 or some other marked spot on the tow line 4.

A perpendicular engagement can also be achieved with a level flight path in a number of different ways.

The preferred approach is to fly into engagement at right angles to the direction of travel of the parasail using flight path 38 and either engaging the tow line 4 directly or lines hanging off the tow line 4. It is also understood that the aircraft could engage lines hanging directly below the parasail.

In a second approach, prior to engagement the winch can be released so the cable plays out very rapidly and the tow line 4 hangs near vertical below the parachute. The UAV 10 then engages the cable from any direction and swings up on the cable and the winch then takes up the slack.

Modern winches can reel in at high speeds. The approach of letting the tow line go slack prior to the arrestment leads to very low loads and long arrestment distances. Also modern parasailing winches will automatically reel out at a pre-set braking force if the load in the tow line 4 exceeds the pre-set force level. This also will reduce the loads and absorb some of the arrestment energy. This pre-set braking force can be lowered enough so that the tow line is playing out prior to the arrestment. This can steady the arrestment cables or net so it is not affected as much by the heaving of the ship. Alternatively, the winch 6 can also eliminate the movement of the arrestment point due to the heaving of the ship by reeling in and out to compensate to make the pilots job easier. The winch could be operated in this manner manually or automatically for example with the control system obtaining feedback from an accelerometer hung on the tow line 4 and trying to minimize the accelerations sensed by the accelerometer parallel to the tow line 4. Alternatively, the accelerometers could be located at the net or recovery lines to directly sense any accelerations and activate the winch or vary the lift and drag of the parasail to minimize those accelerations.

For a heavy UAV, line 25, as seen in FIGS. 5 and 6, can be disconnected from tow line 4 at point 47 and taken by a crew member inside the hangar and attached to a winch so the UAV 51 can be winched into the hangar or out for launch without even touching down on the flight deck. This is possible because the UAV would still be suspended from line 21 on one side and line 25 inside the hangar. For a small boat, line 25 could be used to pull the UAV forward to the back of the boat before it would otherwise land in the water behind the ship. An alternative to this is to have a winch at the top of line 20 or 21 where it attaches to tow line 4 that could retract line 20 or 21 and pull the aircraft up to the tow line 4. An additional alternative is to replace the winch with a pulley and have line 20 or 21 pass through the pulley and then extend down the tow line so that personnel on the flight deck can grab the end of the line and pull the aircraft up to the tow line 4 before it might contact the water behind the ship.

Flight paths 46, 48 and 50 as shown in FIG. 5 are examples where the UAV intersects the tow line 4 at a near parallel angle which is not a preferred approach in that it generally requires greater piloting skill and makes for a poorer energy absorption approach. The preferred approach when using this flight path is the approach previously described where the UAV drops a line that engages a grappling hook on the tow line 4.

FIGS. 14A and 14B show UAV configurations designed to intercept the arresting cable at a near parallel angle. The UAV configuration of FIG. 14A is designed so the wing would deflect any cables to the centerline latching mechanism that it flies up into or alternatively the landing gear struts would deflect any cables to the centerline latching mechanism that the UAV flies down onto or vice versa if the vehicle were flown upside down for engagement. The UAV of FIG. 14B is designed to deflect a cable to a centerline latching mechanism with its lower wing or its V tail surfaces. Other configurations are of course possible, for example, the cables could be deflected to wingtip latches, dedicated deflecting structures could be used, etc.

There are several approaches to prevent the UAV from sliding all the way down the tow line 4 or sliding down and off the secondary arrestment cables 20, 21.

The first approach is to have the inner throat of the latching hook 26 as shown in FIG. 3 smaller than the diameter of the tow line 4 so as to generate a sufficient amount of braking force. In addition, the throat of the latching hook could be spring loaded closed to provide a consistent clamping and thus braking load on the tow line 4 independent of tow line 4 diameter. Another approach is to have the diameter of the tow line 4 equal to or smaller than the throat of the latching hook 26 at the point of engagement so that the initial braking force is the co-efficient of friction times the normal force of the line pulling against the hook but the line would increase in diameter as the UAV slides down the line resulting in a slowly increasing braking force. Significant braking can still occur even though the tow line 4 is smaller in diameter than the throat of the latching hook 26 especially as the UAV and the latching hook 26 turns or the UAV hangs from the tow line 4 so it is not lined up perfectly with the tow line 4 which must then snake through the hook causing drag.

Also as the UAV slides down the tow line 4 there is aerodynamic drag from the forward motion of the ship and the slope of the tow line 4 gets shallower as the UAV gets closer to the ship especially if there isn't a large amount of tension on the tow line 4, so the UAV naturally slows down. The captain can also slow down the boat even to the point that the tow line 4 goes horizontal or sloping back up as the UAV slides down the tow line 4 toward the boat. Tourist parasail operators have such good control that they often bring the parasail rider down and get only his feet wet before raising him back up again.

Another approach is to have a fixed or sliding stop on the tow line 4 which could also be padded to reduce any shock loads as the UAV contacts the stop. A sliding stop could be designed to provide a fixed amount of clamping or braking force on the tow line 4 or might be attached by a line to a small parachute to provide all or part of the braking force or might just be a padded compressible material wrapped around the bottom 30 feet of the tow line 4 to cushion any remaining downward velocity of the UAV.

For the preferred configuration where the secondary arrestment cables 20, 21 are used the UAV cannot slide off the bottom of the cables due to cable 25 connecting the two at the bottom and in addition rigid stops may be placed on the line such as knots in the line that are too large to pass through the throat of the latching hook. The cables 20, 21 at the top end would preferably be attached to tow line 4 as shown in FIG. 6 through a sliding attachment which like a sliding stop is designed to brake against tow line 4 and absorb any kinetic energy parallel to the direction of travel of the tow line 4. Lines 21, 20 and 25 attach to line 200 which assures the proper spacing between these three lines at their upper ends. Line 200 in turn is attached to tow line 4 with ring caribeaners 202 that can slide along tow line 4. To hold this assembly of lines as shown and prevent it from sliding down the tow line, braking mechanism 204 is provided which work like pliers and encircle the tow line 4 like clothes pins. To attach the braking mechanism 206 to the tow line the two handles 208 are spread so that the jaws of the device open enough to be placed around the tow line 4. The handles are then released and springs 206 act to pull the two handles of the braking mechanism 204 together causing the jaws to trap and clamp down on the tow line 4. A rod 210 connects the braking mechanism 204 to the adjacent ring caribeaner 202 and hold the braking mechanism 204 in the proper position at right angles to the tow line 4 for a consistent braking force. The preferred arrestment flight path for this system is shown by flight path 38 in FIG. 8. However if the UAV 51 engages lines 20 or 21 with too high a component of velocity parallel to the tow line 4 such as with flight path 54 as shown in FIG. 8 then braking mechanism 204 slides along the tow line 4 absorbing this energy and preventing peak loads that might damage the UAV or the arrestment system.

Figure 29:
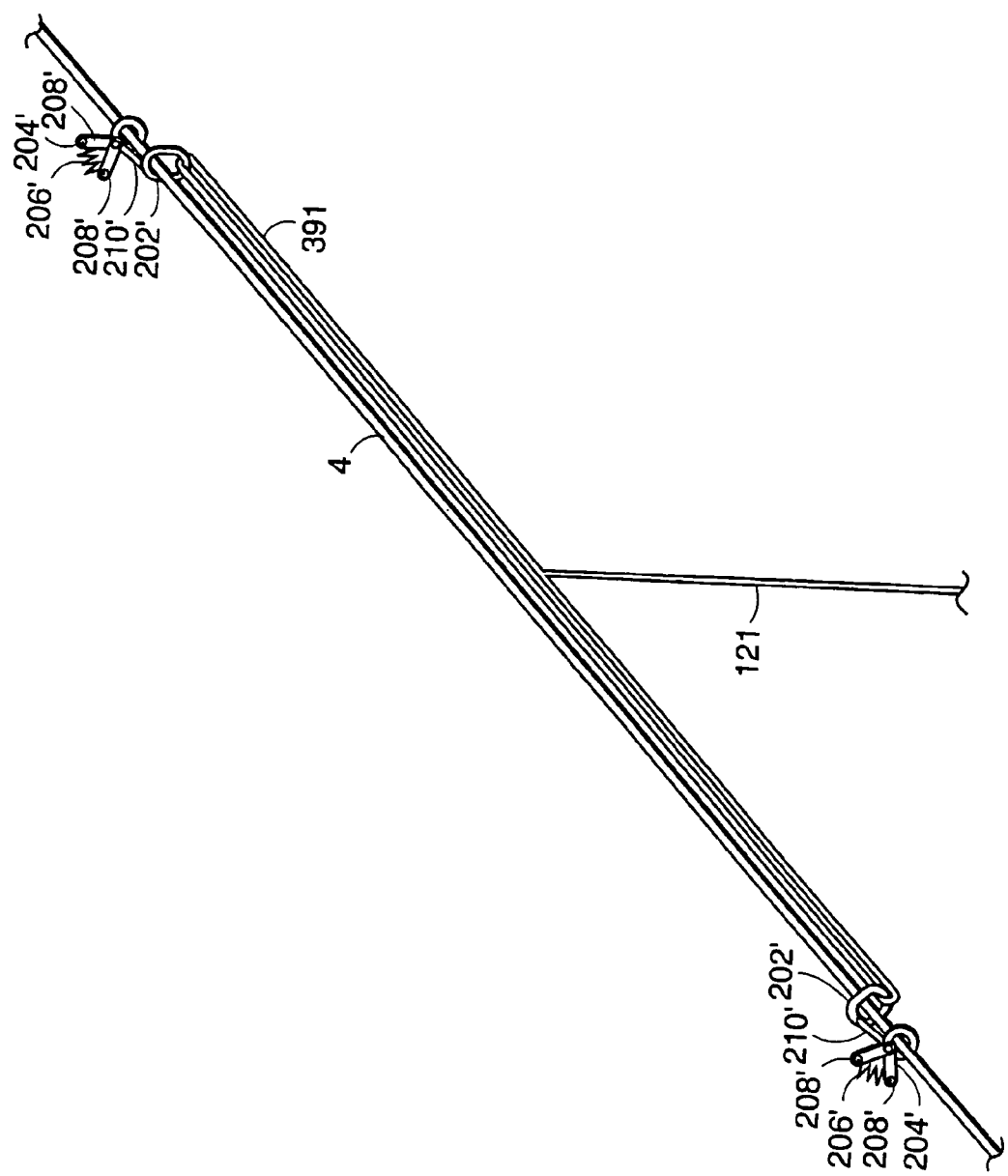
FIG. 29 is a view of an alternate embodiment of the invention in which the arrestment line is suspended from an elastic line for decreasing the arrestment load placed on the aircraft during recovery.

It is understood of course that there could be more than just the two arrestment lines 20, 21. Also in FIG. 7 is an alternate approach where arrestment lines 212 are strung between tow line 4 above and line 214 below. The primary difference in this configuration is that the tension in the arrestment lines 212 are maintained by small weights 220 which hold line 214 down and taut whereas line 25 was held down and taut by parachute 53. Also instead of braking mechanisms 204, bungee cords 390 hold the net in place lengthwise along the tow line and reduce any shock loads parallel to the tow line. FIG. 29 shows a further alternate approach where a single arrestment line 121 is suspended from a bungee cord 391 that spans along a section of tow line 4. It is held adjacent to the tow line by caribeaners 202'. Braking mechanisms 208' may be similarly employed to provide an arrestment load to the recovered UAV. In this fashion, a supplemented arrestment load is imparted to the UAV upon engagement with arrestment line 121 by the combination of the bungee cord 391 and braking mechanism 208'.

The altitude of the parasail can be varied dramatically as is known in the art which can place the arrestment location at different altitudes to avoid ground fog at lower altitudes on one day or a low cloud cover on other days.

Net Enveloping Approach

If a manufacturer or user of a UAV wasn't willing to modify his UAV with the mechanisms just described such as latching hooks 26 then it would be necessary to offer a net system such as shown in FIG. 17. Net 100 is hung from tow line 4 as seen in this isometric view and the UAV uses a lateral flight path such as 38 to intercept the net 100 at near right angles at the center 101 of the net. The very open mesh doesn't let the UAV pass through but lets the UAV's nose penetrate into one of the holes. Preferably the aircraft would be flown in a sideslip to eliminate any crabbing angle relative to the net to make sure the aircraft nose penetrated straight into a hole of the net. A cable 102 is attached at 104 and 106 to the left upper and left lower end of net 100. Likewise cable 108 is attached at 110 and 112 to the upper and lower right corner of net 100. Net 100 itself consists of cables 350, 352, 354 and 356 which comprise the four sides of the net and lines 360 which run up and down and side to side and form the meshing between the sides of the net 100. Lines 360 are firmly tied to each other where they cross in the middle of the net and are also attached to the sides of the net 350, 352, 354, 356 but by loops 370 that are capable of sliding along the sides of the net 350, 352, 354, 356. Velcro break-away straps 380 at each corner of the net however tend to hold lines 360 and loops 370 in their proper position as shown in FIG. 17 prior to an engagement.

Cables 102 and 108 pass loosely through low friction Teflon loops 120 and 122 which also acts as a quick disconnect interface to tow line 4. Cables 102 and 108 can easily slide in loops 120 and 122 and these loops 120 and 122 can also slide along tow line 4 but with a moderate level of friction with a device not shown but similar to the braking mechanism 204 described previously. Small weights 107 and small parachutes 109 are attached to the lower left 106 and right 112 corners of the net 100 so as to provide a retarding force on the lower corners of the net similar to the restraint provided by tow line 4 to the upper corners 104 and 110. From the UAV engagement, the net 100 is driven laterally away from the tow line and into a position shown in the middle of FIG. 18 where the net 100 has encapsulated the UAV 124. FIG. 19 shows the system a fraction of a second later when the Velcro brake away straps 380 release causing the mouth of the net 130 to shut behind the UAV like the tie-wraps on a garbage bag. In a few more seconds the system ends up hanging from the tow line 4 as shown in FIG. 20.

The positive encapsulation of the UAV 124 is achieved because only the net 100 blocks the flight of the UAV 124 and the net 100 is restrained by lines 102 and 108 attaching at four points around the periphery of the net pulling the sides of the net all around the UAV 124 and also because of the closing mouth of the net 100 similar to the tie-wraps on a garbage bag.

Overloading the tow line 4 or the parachute during an arrestment is not a problem for this invention because they would be over-designed for the loads in the same manner as current parasailing equipment. The parachutes typically have 16 risers with each riser capable of an approximate 900 lb. load. The load on the tow line is typically around 900 lbs. but is typically capable of carrying 6 or 7000 lbs. The parachute movement in response to loads also provides a very large shock absorbing capability and modern winches on the ship can be set to automatically play out when loads exceed a certain set amount. Prior to the arrestment the parasail only needs to hold up the ballast so the load on the cable can be very low and still maintain a constant parasail altitude and a low load setting can be selected for the winch which will keep the load in the cable down during the arrestment. For current fixed geometry parasails this requires that the relative wind at the parasail is low which means the ship must slow down or the winch can be playing out before the engagement with the UAV. After the arrestment the ship would speed up or the winch play out load setting would be restored to a higher value to stop the playing out of the tow line 4 and provide more relative parasail airspeed to support the weight of the UAV. When perpendicular arrestments are used such as flight path 38, the arrestment loads will also go down the longer the length of the tow line 4 connecting the ship and the parasail since this results in longer UAV arrestment distances.

Most ships wishing to operate UAVs are orders of magnitude larger than parasail boats and much less maneuverable and responsive and also don't want to have to slow down, speed up or change direction if possible in order to launch or recover a UAV. As a result, it would be advantageous to have a variable geometry parasail that could increase or decrease its lift and drag independent of relative airspeed. It is believed that this can best be achieved using a variation on a technique used for slowing down the opening of a parachute for load control.

Figure 25:
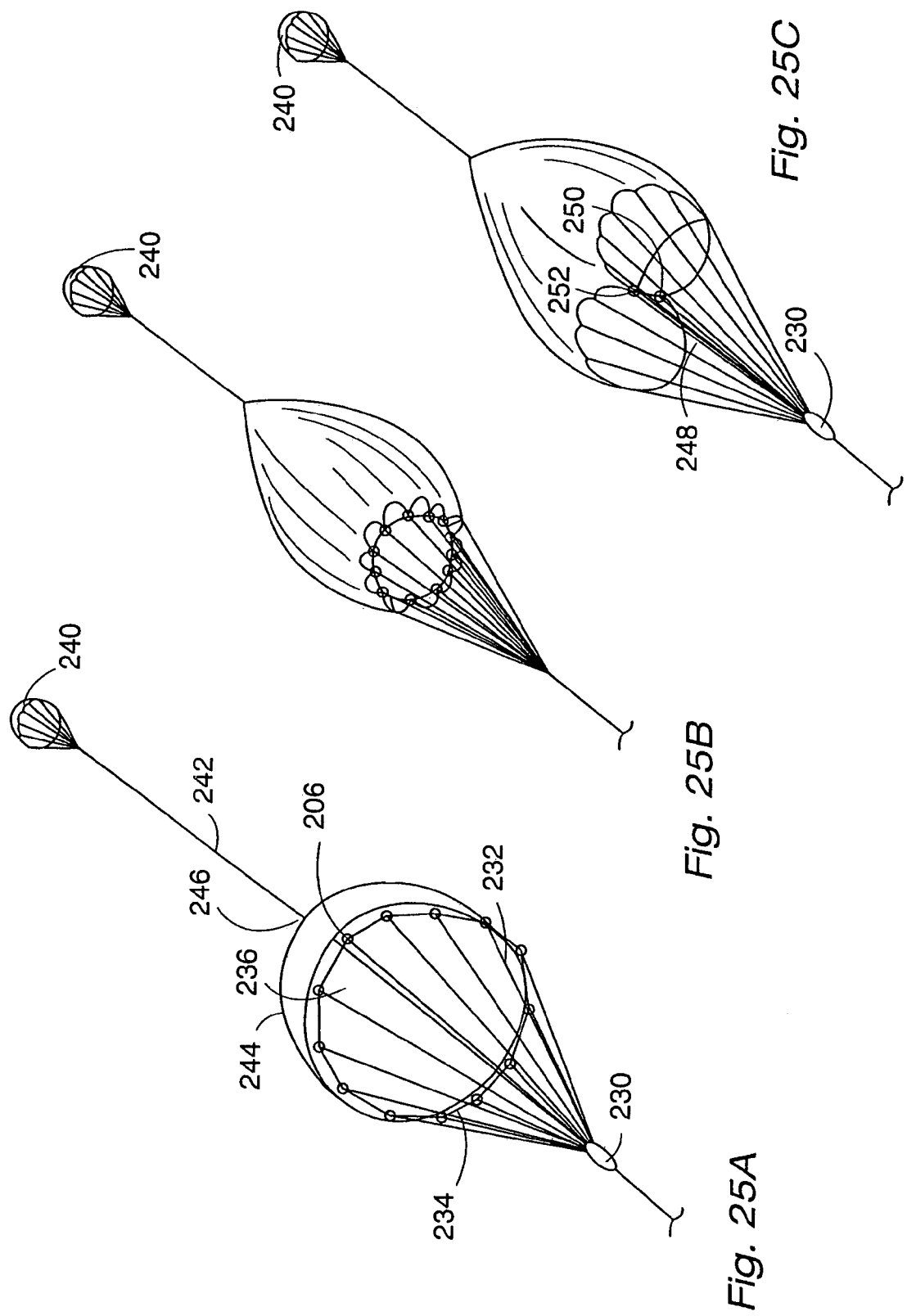
FIGS. 25A, 25B, and 25C show other embodiments of deployable lifting systems.

FIG. 25A shows a parasail 244 that is fully inflated. Remote control unit 230 contains a winch that can reel in or out lines 232 and 234 which in turn pass back and up to the left and right rim of the parasail canopy. Line 232 passes through a pulley and then passes up around the mouth of the parasail canopy through rings 206 attached to each riser and line 234 passes down around the mouth of the parasail canopy. By reeling in lines 232 and 234, remote control unit 230 can close down the parasail mouth such as shown in FIG. 25B in order to reduce the lift and drag of the parasail. This technique is very effective and can greatly reduce the load on the parasail and tow lines. This system has the advantage that the ship can now operate over a much wider speed range without worrying about either having too little parasail lift or too much load or drag on the system. Also only one parasail size is required to launch and recover different sized UAVs or carry various size payloads aloft. After a UAV launch the parasail lift and drag can be reduced to make it easier to pull back down. This system also allows inflation of very large parasails on the flight deck in high winds in a safer more controlled manner by starting with the mouth of the parasail 236 mostly closed down but the parasail lifted into the air by smaller parasail 240 pulling on and lifting line 242 which passes through and is attached to the center of the parachute at 246. Also after the parasail has been winched back down onto the flight deck this system provides one of the best approaches for deflating the parasail in high winds by totally closing off the mouth 236. A small winch in remote control unit 230 can let out line 242 so that parachute 240 will pull back at the center of the parasail 244 at point 246 to further deflate the chute, pull the parasail fabric back in a streamlined manner and keep the parasail material from flapping excessively or getting tangled. With an automated approach the parasail risers and parasail 244 can be retracted all the way onto the winch 6 used to extend and retract the tow line 4. For launching parasail 240 would be deployed in a conventional manner and it would pull the much larger parasail 244 off of the winch 6.

Parasail 244 would also be steerable as is known in the art for paratroop parachutes and remote control unit 230 would have small winches that pull left and right control lines in place of having a paratrooper doing it to keep the parasail in the correct rolled attitude to provide lift vertically. This eliminates the need for ballast which would also make it very difficult to roll the parasail 244 onto the winch 6. Without any ballast required only a very small amount of relative wind would be required to keep the parasail aloft between launches or recoveries. If a lighter than air and preferably a hot air balloon were integrated with this system then the ship could go for long periods and operate in absolute zero relative wind conditions without having to reel the system back in. It is also understood that in addition to or as an alternative to closing down the mouth of a parasail that the lift and drag of the parasail 244 can be varied by pulling or releasing symmetrically the control lines for the steerable parasail which results in symmetrically opening or closing the parasail control vents which is known in the art. Alternatively, a separate vent in the parasail could be opened to lower its drag characteristics using a similar system to that used for the steering vents or similar to that shown in FIG. 25A to close down the mouth of the parasail. Still another alternative is shown in FIG. 25C. In this configuration remote control unit 230 pulls on line 248 which passes through pulleys 250 and 252 at the bottom and top of the parasail canopy rim. By pulling in line 248 remote control unit 230 can pull the top and bottom of the canopy rim together in the middle and partially close down the parasail mouth and reduce the parasail drag.

Another approach to keeping a large towed deployable lifting system up all the time to avoid frequent inflation and deflation and not restrict the direction and speed of the ship is to use a parafoil system steered by a remote control unit which pulls control lines which is known in the art. In low or zero relative wind conditions the system would be unable to launch or recover a UAV but an electric motor driving a propeller could be powered through the tow line 4 to propel the parafoil to fly back and forth or in circles just fast enough to keep the system in the air.

A way to move the tow line 4 over the flight deck for launch and recovery of UAVs but get it out of the way for recovery of a manned helicopter is to utilize the winds by proper orientation and cruising speed of the ship or use a steerable parasail, parafoil or other deployable lifting system to fly the tow line 4 left or right and/or down to get it out of the way with the tow line attach point to the ship at a forward left or right corner of the flight deck 7.

Another less automated approach for deflating a large parasail is shown in FIG. 2 where hook 19 is attached to an aircraft tie down point on the flight deck and winch 6 lets out tow line 4 so that line 18 pulls on the bottom center of the canopy rim at point 37 but the remainder of the riser lines go limp so the parachute collapses.

In order for the ship to properly communicate with and control the UAV it generally needs line of sight communications. As a result, if the UAV flies low or gets too far away an airborne communications relay is required. Instead of launching a second UAV, the parasail can perform this function for the ship operating just like an airborne relay with its own power source etc. or by carrying antennas aloft and receiving the signal and/or power through the tow line 4. The parasail can also carry its own sensors such as radar, TV or infrared sensors to provide local area surveillance or decoy transmitters to draw incoming missiles away from the ship. As a local area surveillance platform it might be especially advantageous to use a steerable parachute as previously described so that the sensors for example could be steered directly over or to the back side of an object of interest close by the ship.

The release structure housing this electronic gear would be designed to be buoyant and water-tight in case it accidentally landed in the water and might even have a catamaran or other stable boat hull so that it could also act as a towed water decoy for the ship when there is inadequate relative wind to keep it in the air. For use as a water borne decoy the parasail would be removed or the release structure would have to hold the parasail 8 risers high enough to keep the parasail from dipping into the water. This electronic equipment would be carried where the water ballast 9 is shown in either FIGS. 1 or 2 and the weight of this electronic equipment would generally be large enough to satisfy the requirement for ballast and eliminate the need for the previously described water ballast 9. Any antennas would generally be hung on the tow line or the parasail risers of the parasail. The parasail rig could also be used to carry a man aloft and then release him with a steerable parachute either for pilot training on how to ditch into the water or to allow a soldier to parasail onto the shore or onto another ship, etc. With a remote control steering mechanism it could also be used in an unmanned application to deliver supplies. For some applications it will be desirable to have a multi-color highly visible parasail for example to make it easier for the UAV to find the arrestment gear however for many military applications it may be more desirable that the parasail is difficult to see by an adversary. In the latter case a transparent parasail material can be used such as that used for weather balloons or a gray parasail as is common for this purpose since it blends so well with various sky colors.

Figure 21:
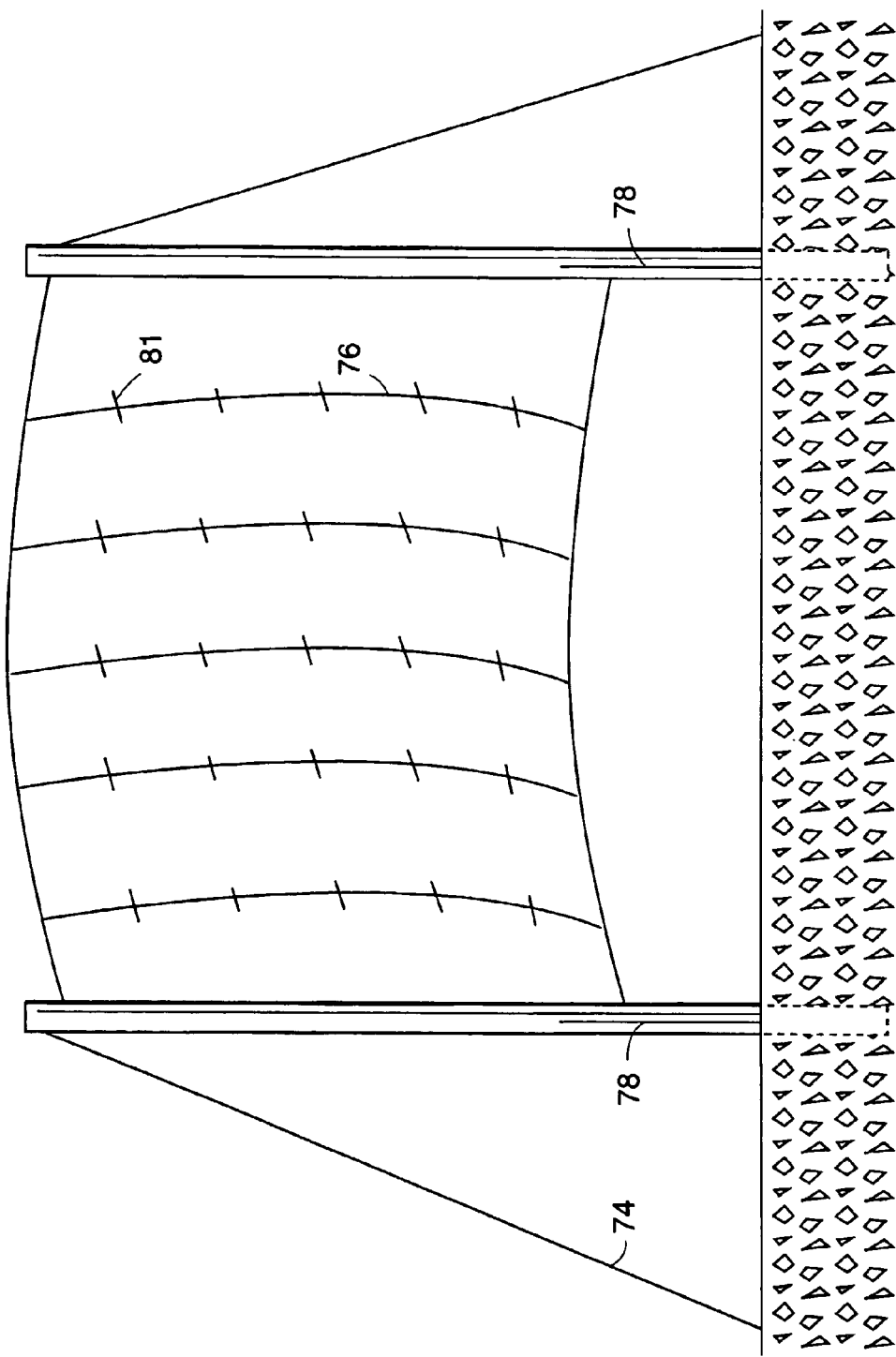
FIG. 21 is an example of how this arrestment approach can be performed without a parasail holding up the arrestment lines by instead using cables strung between two poles.

Although the preferred approach to hold up the lines to engage the UAV for arrestment is to use a deployable lifting surface such as a parasail it should also be understood that the aircraft could latch onto lines suspended between poles mounted in the ground as shown in FIG. 21. For example the same techniques described previously to engage the slanted parasail tow line 4 or lines 20, 21 could be used to engage slanted guy line 74 or vertical lines 76 in FIG. 21. Line 74 is an example where stops are not used while lines 76 are shown with stops 81 to prevent the UAV from sliding down the lines. These stops 81 for example can consist simply of a knot in the line with or without a washer resting on top of it or it could consist of a ring around the line that squeezes down on the line to generate friction to hold it in place or to slide along the line with energy absorbing drag. The energy absorbing mechanisms for this deck mounted system are flexible supporting posts 78 which can bend without breaking and the elasticity inherent in the lines 74, 76.

Figure 27:
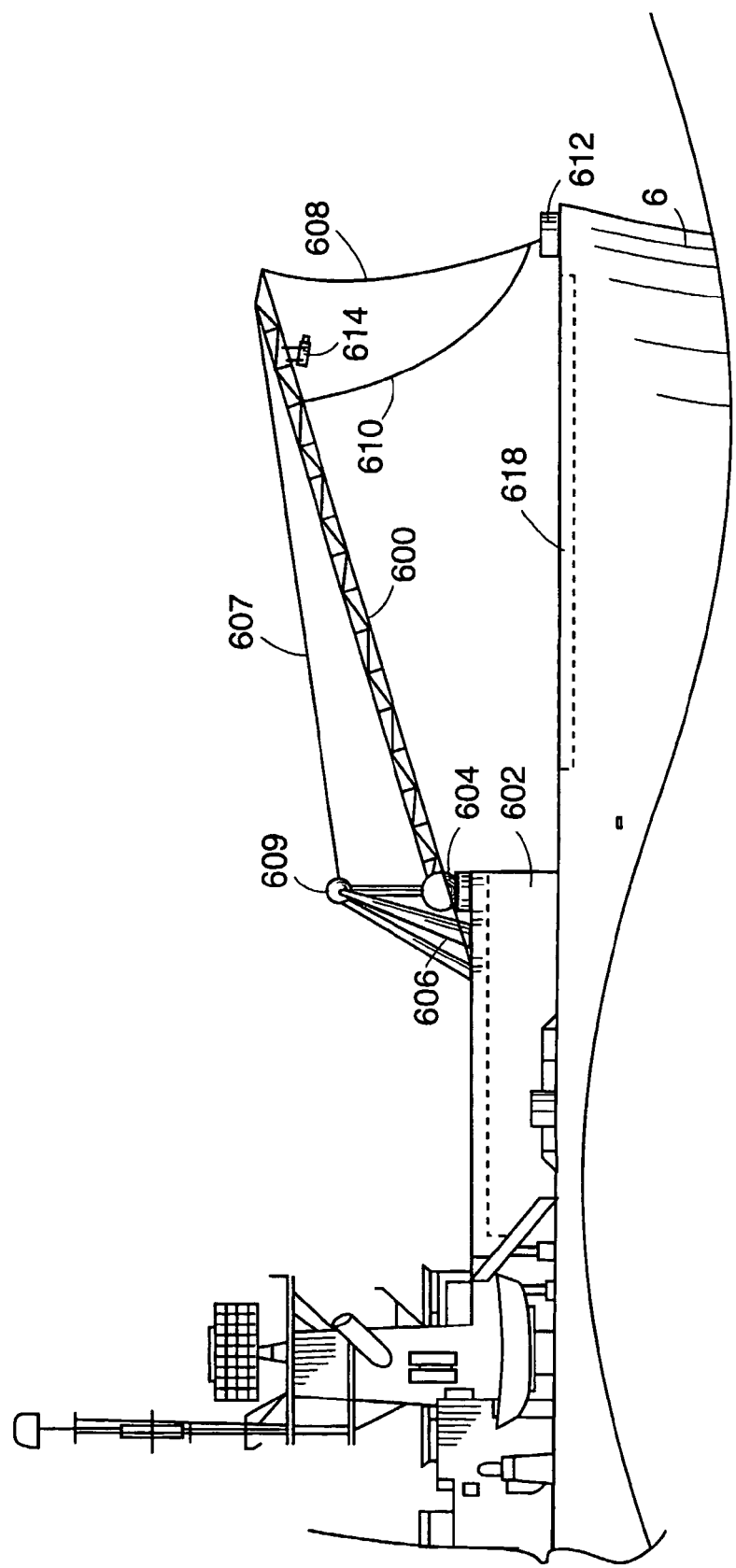
FIG. 27 is a view of an alternate embodiment of the invention featuring a rotating arm on the back of a ship for suspending arrestment lines.
Figure 28:
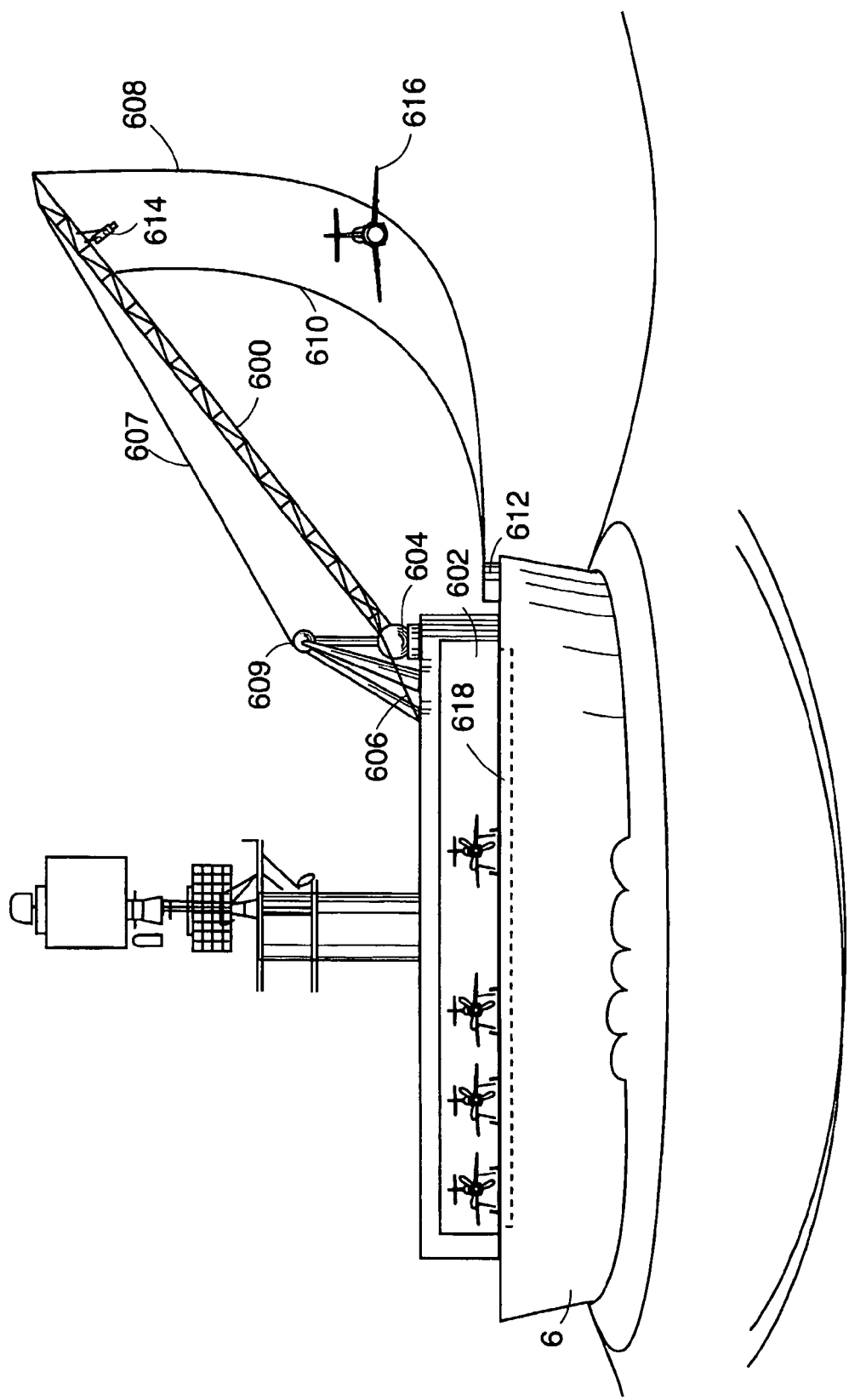
FIG. 28 is a view from the rear of a ship in which the rotating arm is swung away from the ship.

As an additional different embodiment, arrestment lines could be suspended from the end of a rotating arm attached to the superstructure of a ship. FIGS. 27 and 28 show an example of a rotating arm extending from a ship for suspending the recovery system. Beam 600 is attached to the side of the ship's hangar 602 from a rotating base 604. A line 606 controls the horizontal movement of beam 600 from an aft position to a position extending laterally from the ship as shown in FIG. 28 and a line 607 supports the beam 600 and controls the vertical movement of the beam. A winch 609 can reel in or out line 607 in order to raise or lower the boom and by alternately reeling in and out can take out the effect of the rolling of the ship in heavy seas. The winch 609 can be controlled manually to perform this function or can be performed by an automatic system that for example measures the slope of the beam and drives the winch 609 to for example keep the beam level as the ship rolls. Arrestment lines 608 and 610 are suspended from the beam 600 at their upper end and connect down to an arrestment engine 612 which is known in the art as a way to absorb energy for net or cable recovery systems. Some of these arrestment engines use a paddle in a drum of water, and they would allow lines 608 and 610 to be pulled off of a reel with a braking force.

The aircraft 616 is flown into and engages vertically hung arrestment lines 608 and/or 610 as previously described while flying in the same direction as the ship and the ship is preferably oriented directing into the wind. Beam 600 would be oriented in a laterally extending position in relation to the ship. The aircraft 616 may be guided by its internal camera or a centerline camera 614 on the boom 600 can also be used by the pilot to steer the aircraft in. After the aircraft 616 engages the cables 608 and/or 610 the boom 600 swings forward as the aircraft 616 is slowed to a stop. Stops, as described above, are placed on the lines 608, 610 to prevent the aircraft 616 from falling into the water after the arrestment. Line 606 is then manipulated so that boom 600 can be rotated over the flight deck 618 so that the aircraft 616 can be retrieved from the recovery system.

Figure 22:
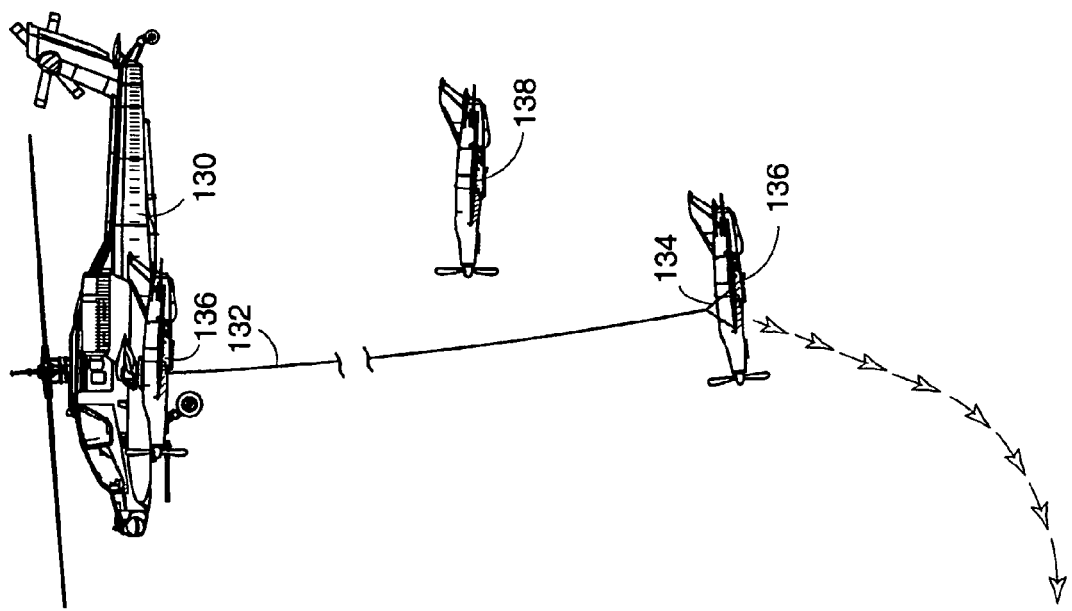
FIG. 22 is a means of launching and retrieving UAVs with a helicopter.

A different approach is required for land based launch and recovery since you don't always have the relative wind of a ship based system. One land based approach is to use a helicopter as shown in FIG. 22. Prior to flying on a mission an external load line 132 is attached to the bottom of one of the helicopters 130 in an attack group which has a release mechanism 134 and UAV 136 attached to the other end. The helicopter 130 carries the UAV 136 to altitude where it is released by the release mechanism 134 and launched as described previously for the parafoil system. The UAV 136 could of course also be carried to altitude for launch under one of the helicopters pylons as also shown in FIG. 22. After launching all the UAVs the helicopter drops the line 132, and release mechanism 134 back at the home field. The UAV 136 then flies out with the helicopter 130 to perform a mission where it flies high to find and designate targets while the manned helicopter 130 can stay hidden below the tree line and pop up only to fire its missiles at the targets designated by the UAV 136. When the helicopter 130 returns home the external load line 132 and release mechanism 134 or a separate load line without the release mechanism are again attached to the helicopter 130 which carries it aloft. The UAV 138 returning at the end of the mission then engages the vertical hanging cable as previously described and is lowered to the ground. The UAV 138 at engagement is not flying that much faster than the helicopter or the line 132 is long enough and the UAV 138 engages the line low enough that the UAV 138 will never swing up to the level of the helicopter 130. The pilot controlling the UAV 138 could use the UAV's thrust and directional control with the propeller slipstream blowing over the rudder and horizontal tail to steer the UAV 138 to the best landing location while hanging below the helicopter 130 and keep from getting under the helicopter downwash by staying out in front.

Figure 23:
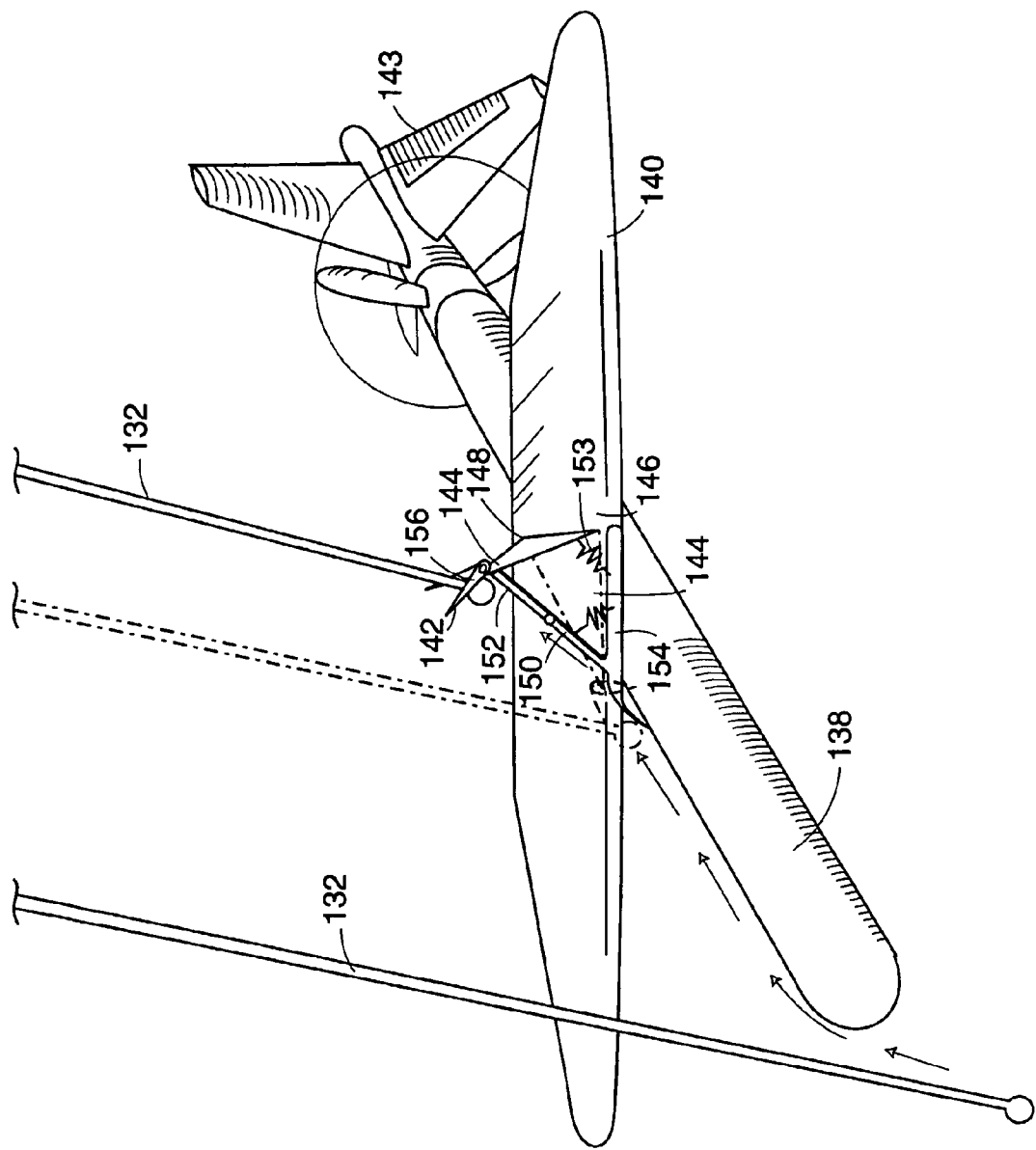
FIG. 23 shows a mechanism for holding the UAV level by attaching at a rigid point well above the center of gravity.

For large UAVs or landing on the ground it is more critical that the UAV 138 be hanging perfectly upright so it lands on its wheels and not for example a wing. FIG. 23 shows a mechanism that makes this possible with the pre-engagement position shown in solid and the post-engagement position shown in dashed lines. UAV 138 is shown with the wing 140 in an oblique position as described earlier to deflect the vertically hanging cable 132 laterally into engagement with latching hook 142 which is integrated into the end of wing leading edge arm 144 which is shown shaded in the figure and forms the leading edge of the wing section over the fuselage and lays flat and aerodynamically blended along the top of the wing as shown with one hinge point 146 on the front of the wing's front spar and one hinge point 148 on the back of the back wing spar for a strong, lightweight and aerodynamic design. The load from line 132 during the engagement lifts the latching hook 142 and attached arm 144 to the vertical position shown in dashed lines where it can't rotate any further due to rods 150 and 152 which can lock arm 144 in position and provide a connection at 154 to the wing's front spar and at 156 to the arm 144 just below the latching hook 142. With this approach the UAV 138 is now suspended by the cable 132 at a point substantially over the center of gravity so that it will land on its landing gear. Before engagement, rods 150 and 152 are folded up and streamlined underneath arm 144 and in front of the wing torque box structure. Latching hook 142 or an attach point on arm 144 near latching hook 142 can be used to attach the load line 132 and raise the UAV 138 for launch and at release, arm 144 is spring loaded by springs 151 and 153 to go back to its down, streamlined position (shown in shaded, solid lines). If latching hook 142 is used as the attach point then an actuator in the latching hook 142 and controlled by the UAV can be used to retract the latching mechanism for release during the launch.

Alternatively rods 150 and 152 can be deleted from the design which eliminates the restraining mechanism for arm 144 which allows the UAV to change and control its pitch attitude while hanging on cable 132 using its propeller wash blowing over elevators 143. This alternative approach can be advantageous for launch since the UAV can hold itself in a nose up attitude where the thrust from the UAVs engine can assist in raising the aircraft. For landing by holding the aircraft level in pitch the aircraft will also be level in roll independent of the exact swept position of the wing 140.

During an arrestment, arm 144 will swing almost 180 degrees about hinge points 146 and 148 to lay over the aft swept wing 140. The load from the arrestment can then be used to rotate the wing 140 to a more highly swept position over the fuselage if this is desirable such as to avoid contact with the ground or other objects on landing and reduce any download from the helicopter downwash that might also try to overturn the UAV 138.

Figure 24:
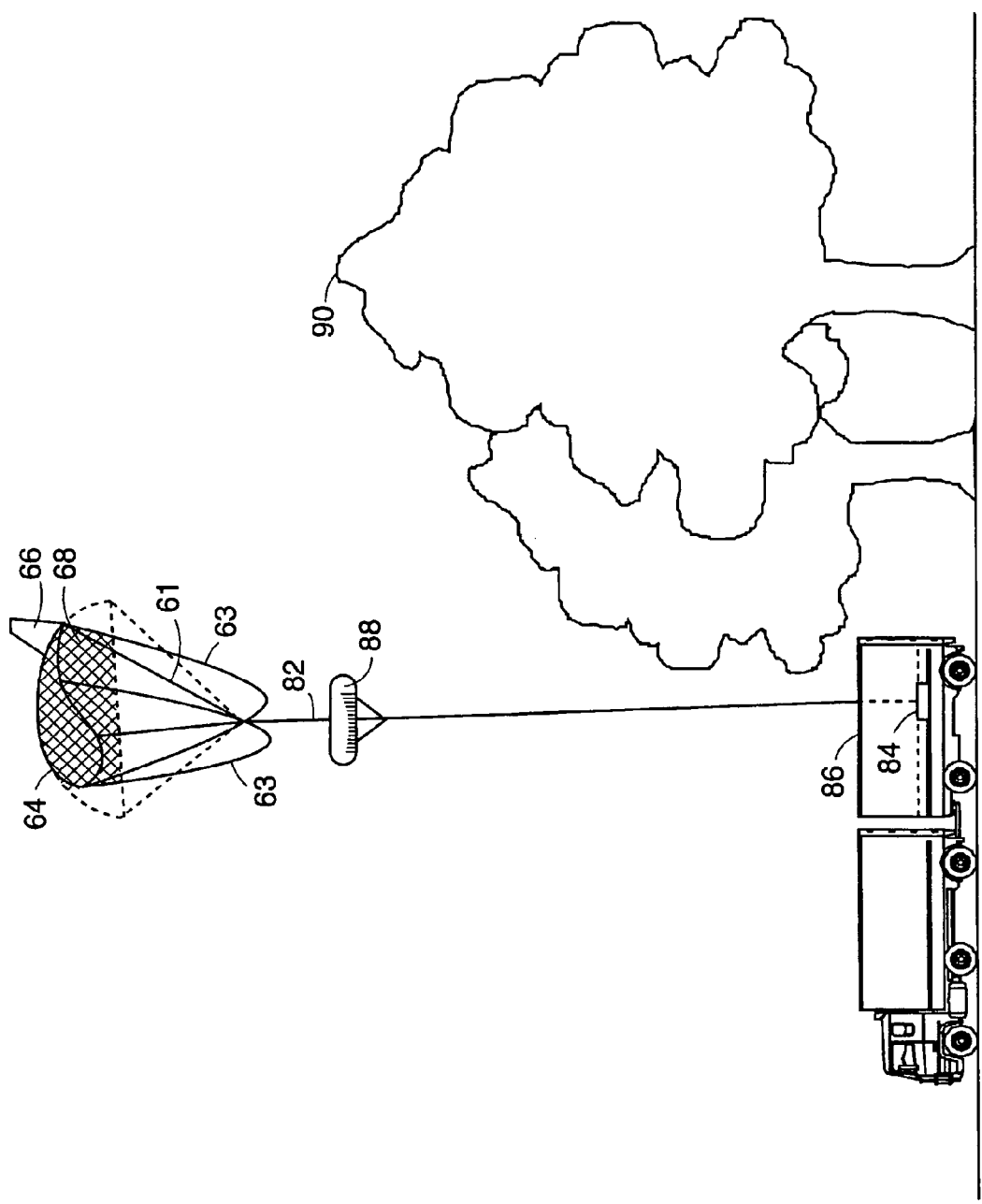
FIG. 24 is a variation on the invention for recovery of UAVs on land.

Another approach for land based use is to use lighter than air such as helium or hot air as the lifting system. A lighter than air approach gets very large however unless it is used in combination with a parasail type system so the lighter than air lift required is only enough to get the parasail and tow line 4 aloft in zero wind conditions. FIG. 24 shows one such approach where the lighter than air balloon and lifting parasail are integrated together. There are risers 61 that hold the balloon down and are essentially always taut and there are risers 63 that are attached to parasail fabric 68 which in turn is attached around the sides of the balloon 64 and surround risers 61. In a no wind condition risers 63 and attached parasail fabric material 68 is limp as shown in solid lines and cross-checked area in FIG. 24. With a relative wind the parasail inflates quickly to the position shown in dashed lines because risers 61 inside of the parasail fabric act to hold open the mouth of the canopy so it will capture air. The balloon 64 is biased with more volume and thus more lift forward of the center of the parachute, parasail or parafoil which in a wind helps keeps the rotational position of the parasail about its symmetrical axis oriented with the forward end up to provide lift pointed upward in a similar manner to how the ballast is used with a conventional parasail to keep it properly oriented. The balloon 64 thus provides the lift to get the parasail airborne but also helps to properly orient it and hold it partially open so that it will rapidly fully inflate under a load or a wind. Balloon 64 could have vertical tail fins 66 to keep the balloon oriented into the wind but preferably would just have aft biased panels on the parasail to provide this function as is known in the art.

A tether line 82 connects to the bottom of the balloon 64 and parachute 68 system which in turn is attached to the ground or even hand held or for a large system a winch 84 for retracting the system down through the open roof of trailer 86 for transporting the system. Part way up the line is air inflated cushion 88. For an arrestment the roof of the transporter is opened and the balloon 64 is allowed to rise to a point above any obstructions such as trees 90. UAV 80 flies into and engages tether line 82 below balloon 64 and above cushion 88. It should be understood that any of the alternative flight path and engagement means previously described for the pure parasail system also apply for this land based hybrid system. Due to the wind if any and the translational speed after UAV 80 engagement, the parachute material 68 deflects out and inflates providing the primary source of lift and drag of the system to slow the translational speed of the UAV 80 and provide a low descent rate. The UAV 80 slides down the cable 82 until it rests on top of air cushion 88 which is large enough to cover the entire underside of the UAV 80 and cushion the impact with the ground. After the UAV 80 lands on the ground the lighter than air balloon 64 keeps the parachute up out of the bushes. However one preferred approach is not to land on the ground at all but to have the winch reel the UAV in as it is descending to land on the floor of the trailer whose side-walls might fold down to be out of the way during the landing. With this approach air cushion 88 might still be used for the case when the winch 84 might fail or could be replaced with a very large air cushion on the floor of the trailer. The drum for winch 84 runs the length of the trailer 86 so that the risers 61 and 63 and parasail fabric 68 can also be wound up on the drum and balloon 64 can be rapidly drawn back down into the trailer for transportation. The winch also might be powered by a drive shaft from the vehicles main transportation engine.

It is also understood that instead of a lighter than air element to keep the parasail aloft in zero wind conditions electric power could be provided through the cable 82 to power an electric motor that drives a propeller that flies the parasail or parafoil back and forth or in a circle until the engagement.

The invention claimed is:

1. An aerial recovery system for recovering an aircraft, said system comprising;

the aircraft and an arrestment line held up at an upper end by support structure supported by a base, a lower end of the arrestment line also being connected to the base, said arrestment line not being a support for said support structure in the form of a rigid, straight-line guy line tension-tie connection between an immovable upper end attached to the support structure and an immovable lower end, said aircraft containing a capturing device for capturing said line, said capturing device comprising a hook positioned laterally of a longitudinal axis of said aircraft, said hook being adapted to releasably secure said line to said aircraft, said hook being the primary means of capturing said aircraft, said aircraft containing structure suitable for deflecting said line laterally into engagement with said hook, said structure comprising a wing of said aircraft.

2. The aerial recovery system of claim 1 in which said hook has a line retaining device.

3. The aerial recovery system of claim 1 in which said capturing device is positioned on a forward inboard edge of a wing of said aircraft.

4. The aerial recovery system of claim 1 in which the capturing device is located inboard of the aircraft's wingtip.

5. The aerial recovery system of claim 4 in which the capturing device is located inboard more than 5% of the wing semi-span.

6. The aerial recovery system of claim 1 in which multiple generally vertically oriented arrestment lines are spaced apart across the direction of travel of said aircraft as it approaches for recovery so as to increase the lateral capture envelope of said recovery system.

7. The aerial recovery system of claim 1 in which said lateral deflecting structure is swept at least fifteen degrees.

8. The aerial recovery system of claim 1 wherein the arrestment line is held up by a pole.

9. The aerial recovery system of claim 1 wherein said arrestment line is held up by a slender structural member.

10. The aerial recovery system of claim 1, wherein the line is a cable.

11. The aerial recovery system of claim 1, wherein the motion of the aircraft during deceleration is accommodated by compliance of the line.

12. The aerial recovery system of claim 1 wherein the arrestment line is held up by a beam and wherein the beam is mounted to move under the force of the aircraft's striking the arrestment line.

13. The aerial recovery system of claim 1 wherein the arrestment line and the capturing device are configured to restrict sliding of the aircraft along the line after the line is guided into connection with the hook.

14. The system of claim 1 wherein the base comprises the ground.

15. The system of claim 1 wherein the base comprises a water craft.

16. The system of claim 1 wherein the hook extends around forward of the line after capture of the line.

17. The system of claim 1 wherein the lower end of the line is connected to the base through an energy-absorbing device.

18. The system of claim 1 wherein said system comprises a single arrestment line.

19. The system of claim 1 wherein said system includes more than one hook and more than one arrestment line.

20. In combination, a flying object and an apparatus adapted for capturing the flying object, the flying object having a spanwise lifting surface with a capture device positioned laterally of the centerline of the flying object, the capture device comprising a hook adapted to releasably secure the flying object to the apparatus, the hook being the primary means of capturing said flying object, the flying object being adapted for flying along a flight path, the apparatus comprising:

an arrestment line positionable in the flight path of the flying object, at least a portion of the arrestment line being inclined at an angle relative to the spanwise lifting surface to intersect the leading edge of the spanwise lifting surface, the arrestment line being positioned to engage the capture device of the flying object to releasably secure the flying object to the apparatus; and a support structure coupled to the arrestment line at two spaced-apart positions and positioned to support a portion of the arrestment line between said positions in the flight path, said arrestment line not being a support for said support structure in the form of a rigid, straight-line guy line tension-tie connection between an immovable upper end attached to the support structure and an immovable lower end.

21. The combination of claim 20 wherein the arrestment line includes a cable or pole.

22. The combination of claim 20 wherein the hook includes a latch.

23. The combination of claim 20 wherein the hook is positioned forward of a line defined by a leading edge of a wing inboard of the hook.

24. The combination of claim 20 wherein the spanwise lifting surface is swept at least fifteen degrees.

25. In combination, a flying object and an apparatus adapted for capturing the flying object, the combination comprising:

a) a line suspended across the flight path of the object in an orientation which includes a component normal to the flight path;

b) support structure, with a load path to a base, suspending the line, a lower end of the line being restrained to prevent the line from blowing freely in the wind, the arrestment line not being a support for the support structure in the form of a rigid, straight-line guy line tension-tie connection between an immovable upper end attached to the support structure and an immovable lower end; and c) a device located off the centerline of the flying object, the device being adapted for intercepting the line after the line slides laterally along a leading edge of a structure comprising a wing of the flying object and holding the flying object to the line, the device being the primary means of capturing the flying object, the load path not including the arrestment line below the flying object.

26. The combination of claim 25, wherein the line is a cable.

27. The combination of claim 25, wherein the device adapted for intercepting the line comprises a hook on the wing of the flying object, the hook including a line retaining device.

28. The combination of claim 25, wherein the motion of the flying object during deceleration is accommodated by compliance of the line.

29. The combination of claim 25 wherein the leading edge of the structure comprising a wing swept at least fifteen degrees.

30. The combination of claim 29, wherein the device adapted for intercepting the line comprises a hook on the wing of the flying object and includes an inner throat smaller than the diameter of the line so as to generate a sufficient amount of braking force such that after the line is intercepted by the hook, sliding of the line through the hook is substantially arrested.

31. The combination of claim 25 wherein an energy absorbing device is attached to the lower end of the line.

32. An aerial recovery system for capturing an aircraft, said system comprising;
the aircraft and
an arrestment line held up at at least one end by an aerial lifting apparatus that uses a relative wind to generate lift, said aerial lifting apparatus not being a rotary wing apparatus that generates lift by blowing air down through a rotor,
said aircraft containing a hook adapted for capturing said line and releasably securing said aircraft to said arrestment line, said hook being positioned laterally of a longitudinal axis of said aircraft, said hook being the primary means of capturing said aircraft,
said aircraft containing structure suitable for deflecting said line laterally into engagement with said hook, said structure comprising a wing of said aircraft, said structure being swept at least fifteen degrees from an inboard end of the wing to an outboard end of the wing.

33. The aerial recovery system of claim 32, wherein the hook includes an inner throat smaller than the diameter of the line so as to generate a sufficient amount of braking force such that after the line is intercepted by the hook, sliding of the line through the hook is substantially arrested.

34. The aerial recovery system of claim 32 wherein the arrestment line is restrained at a lower end to prevent the arrestment line from blowing freely in the wind.

35. The system of claim 32 wherein said hook comprises a retaining structure adapted to prevent said arrestment line from disengaging from said hook.

36. The system of claim 32 wherein the hook extends around forward of the line after capture of the line.

37. The system of claim 32 wherein the aerial lifting apparatus also comprises a lighter-than-air balloon.

38. The system of claim 32 wherein said aerial lifting apparatus is attached to a water craft.

39. The system of claim 32 wherein said aerial lifting apparatus has a fabric aerodynamic lifting surface.

* * * * *

UNITED STATES PATENT AND TRADEMARK OFFICE
Certificate

Patent No. 7,097,137 B2                                                                           Patented: August 29, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: William R. McDonnell, St. Louis, MO (US); and Charles H. Baker, Union, MO (US).

Signed and Sealed this Twenty-seventh Day of July 2010.

*Michael R. Mansen*
*Supervisory Patent Examiner*
Art Unit 3644
Technology Center 3600

UNITED STATES PATENT AND TRADEMARK OFFICE
Certificate

Patent No. 7,097,137 B2                                                                  Patented: August 29, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: William R. McDonnell, St. Louis, MO (US); and Charles H. Baker, Union, MO (US).

Signed and Sealed this Twenty-fourth day of August 2010.

<div align="right">

MICHAEL R. MANSEN
*Supervisory Patent Examiner*
Art Unit 3654
Technology Center 3600

</div>